(12) United States Patent
Tsumiyama

(10) Patent No.: US 8,181,553 B2
(45) Date of Patent: May 22, 2012

(54) POSITION CONTROL MECHANISM FOR BICYCLE CONTROL DEVICE

(75) Inventor: Akira Tsumiyama, Osaka (JP)

(73) Assignee: Shimano Inc., Osaka (JP)

( * ) Notice: Subject to any disclaimer, the term of this patent is extended or adjusted under 35 U.S.C. 154(b) by 2395 days.

(21) Appl. No.: 10/971,533

(22) Filed: Oct. 25, 2004

(65) Prior Publication Data

US 2006/0086198 A1  Apr. 27, 2006

(51) Int. Cl.
*F16C 1/10* (2006.01)
*G05G 11/00* (2006.01)
*G05G 13/00* (2006.01)

(52) U.S. Cl. ........................................ 74/502.2; 74/489

(58) Field of Classification Search .................. 74/502.2, 74/501.6, 489, 488; 192/217; B62K 23/02
See application file for complete search history.

(56) References Cited

U.S. PATENT DOCUMENTS

| 5,012,692 | A | 5/1991 | Nagano |
| 5,044,213 | A | 9/1991 | Nagano |
| 5,203,213 | A | 4/1993 | Nagano |
| 5,241,878 | A | 9/1993 | Nagano |
| 5,257,683 | A | 11/1993 | Romano |
| 5,400,675 | A | 3/1995 | Nagano |
| 5,479,776 | A | 1/1996 | Romano |
| 5,730,030 | A | 3/1998 | Masui |
| 5,921,138 | A | 7/1999 | Kojima et al. |
| 6,450,060 | B1 * | 9/2002 | Shahana ...................... 74/502.2 |
| 6,502,477 | B1 | 1/2003 | Assel |
| 6,647,823 | B2 | 11/2003 | Tsumiyama et al. |
| 7,124,873 | B2 * | 10/2006 | Tsumiyama .................. 192/217 |
| 7,437,969 | B2 * | 10/2008 | Ose .............................. 74/502.2 |
| 2002/0124679 | A1 | 9/2002 | Dal Pra |
| 2002/0139637 | A1 * | 10/2002 | Tsumiyama et al. ......... 192/217 |
| 2004/0005947 | A1 | 1/2004 | Shahana et al. |
| 2004/0040402 | A1 | 3/2004 | Tsumiyama et al. |

FOREIGN PATENT DOCUMENTS

| DE | 100 55 922 A1 * | 5/2002 |
| DE | 10055403 A1 | 5/2002 |
| EP | 0 671 317 B1 | 9/1995 |
| EP | 0 698 548 B1 | 2/1996 |
| EP | 1 134 158 B1 | 9/2001 |
| EP | 1 232 940 A2 | 8/2002 |
| EP | 1 264 764 A2 | 12/2002 |
| EP | 1 440 878 A2 | 7/2004 |

* cited by examiner

*Primary Examiner* — Vinh T. Luong

(74) *Attorney, Agent, or Firm* — Global IP Counselors, LLP

(57) ABSTRACT

A position control mechanism is provided for a bicycle control device that has a shifting unit. The position control mechanism has an operating member that is configured to operate a positioning member that moves through two of a plurality of predetermined shift positions during a single progressive movement of the operating member. The operating member is configured in the preferred embodiment to operate both a hydraulic braking unit and the shifting unit.

15 Claims, 21 Drawing Sheets

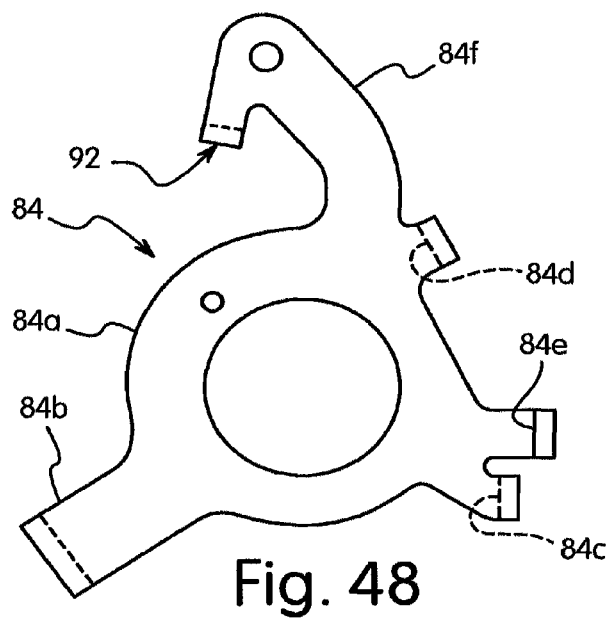
Fig. 48
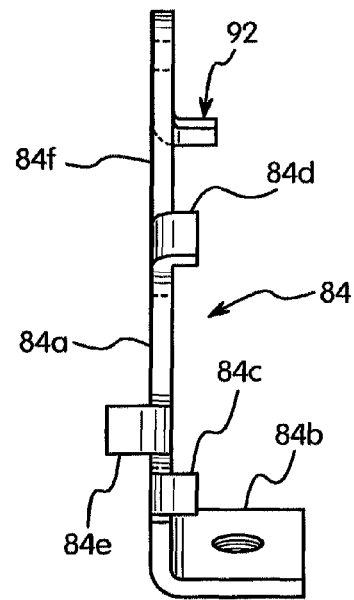
Fig. 49
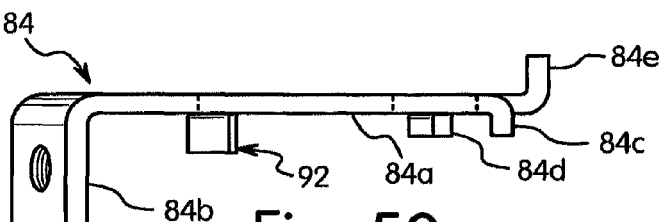
Fig. 50
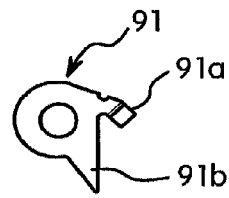
Fig. 51
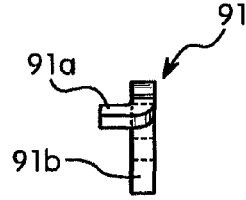
Fig. 52
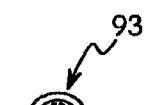
Fig. 55
Fig. 53
Fig. 54
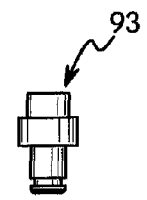
Fig. 56

POSITION CONTROL MECHANISM FOR BICYCLE CONTROL DEVICE

BACKGROUND OF THE INVENTION

1. Field of the Invention

This invention generally relates to a bicycle control device. More specifically, the present invention relates to a position control mechanism for a bicycle control device such as a shifter.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for braking and/or shifting have been extensively redesigned in recent years.

Generally, when riding a bicycle, it is desirable to be able to operate the brake control mechanism and the shift control mechanism of the bicycle quickly and easily while maintaining a firm grasp on the handlebar. Some bicycles have brake levers that are separate from and the shifting devices such as disclosed in U.S. Patent Application Publication No. US2004/0005947 (assigned to Shimano, Inc.). However, other bicycle control devices have been developed the combine both the braking and shifting functions into a single unit. Examples of such control devices of this type are disclosed in the following U.S. Pat. Nos. 4,241,878; 5,257,683; 5,400,675; and 6,073,730; and 6,212,078. For effecting braking and speed change, some of these known control devices have a brake lever that also acts as a shift lever that winds a wire takeup element and a release lever located behind a brake/shift lever. While other known control devices have a shift lever that winds a wire takeup element located behind a brake lever and a release lever that is located laterally of the brake lever. Thus, the rider can carry out braking and speed change operations without the rider changing from one lever to another. One example of a bicycle control device with a single brake/shift lever is disclosed in U.S. Patent Application Publication No. US2002/0139637 (assigned to Shimano, Inc.).

In view of the above, it will be apparent to those skilled in the art from this disclosure that there exists a need for an improved bicycle control device. This invention addresses this need in the art as well as other needs, which will become apparent to those skilled in the art from this disclosure.

SUMMARY OF THE INVENTION

One object of the present invention is to provide a bicycle control device with a position control mechanism and an operating lever that is simple to operate during braking and gear shifting operations.

Another object of the present invention is to provide a position control mechanism of a bicycle control device with a positioning member that moves through two of a plurality of predetermined shift positions during a single progressive movement of the release member.

Another object of the present invention is to provide a bicycle control device that is relatively simple and inexpensive to manufacture and assemble.

The foregoing objects can basically be attained by providing a position control mechanism for a bicycle control device that comprises a positioning member, a position maintaining member and a position releasing mechanism. The positioning member is configured and arranged to be biased in a first rotational direction about a rotational axis. The position maintaining member is configured and arranged to selectively maintain the positioning member in one of a plurality of predetermined shift positions. The position releasing mechanism includes first and second driving members that are configured and arranged to selectively release the position maintaining member from engagement with the positioning member. The positioning member is movable through at least two of the plurality of predetermined shift positions in the first rotational direction in response to a progressive movement of the position releasing mechanism. The first driving member is located radially outward of the position maintaining member relative to the rotational axis of the positioning unit.

The foregoing objects can basically be attained by providing a position control mechanism for a bicycle control device that comprises a positioning member, a position maintaining member and a position releasing mechanism. The positioning member is configured and arranged to be biased in a first rotational direction about a rotational axis. The position maintaining member is configured and arranged to selectively maintain the positioning member in one of a plurality of predetermined shift positions. The position releasing mechanism is configured and arranged to selectively release the position maintaining member from engagement with the positioning member. The position releasing mechanism includes a release member, a first driving member and a second driving member. The first driving member is movably fixed to the release member to selectively release the position maintaining member from engagement with the positioning member in response to movement of the release member. The second driving member is non-movably fixed to the release member to selectively release the position maintaining member from engagement with the positioning member in response further movement of the release member such that positioning member moves through two of the plurality of predetermined shift positions during a single progressive movement of the release member.

The foregoing objects can alternatively be attained by providing a bicycle control device that includes a wire take up member, a positioning member, a position maintaining member and a user operating mechanism. The wire take up member is arranged to rotate about a rotational axis to wind a shift cable wire of shift cable. The positioning member is coupled to the wire take up member and arranged to be biased in a first rotational direction about the rotational axis. The position maintaining member is configured and arranged to selectively maintain the positioning member in one of a plurality of predetermined shift positions. The user operating mechanism is configured and arranged to perform a shifting operation by pulling and release the shift cable wire. The user operating mechanism includes a release member, a first driving member and a second driving member. The first and second driving members are configured and arranged to selectively release the position maintaining member from engagement with the positioning member. The positioning member is movable through at least two of the plurality of predetermined shift positions in the first rotational direction in response to a progressive movement of the position releasing mechanism. The first driving member is located radially outward of the position maintaining member relative to the rotational axis of the positioning unit.

The foregoing objects can alternatively be attained by providing a bicycle control device that includes a wire take up member, a positioning member, a position maintaining member and a user operating mechanism. The wire take up member is arranged to rotate about a rotational axis to wind a shift cable wire of shift cable. The positioning member is coupled to the wire take up member and arranged to be biased in a first rotational direction about the rotational axis. The position maintaining member is configured and arranged to selectively maintain the positioning member in one of a plurality of predetermined shift positions. The user operating mechanism is configured and arranged to perform a shifting operation by pulling and release the shift cable wire. The user operating mechanism includes a release member, a first driving member and a second driving member. The first driving member is movably fixed to the release member to selectively release the position maintaining member from engagement with the positioning member in response to movement of the release member. The second driving member is non-movably fixed to the release member to selectively release the position maintaining member from engagement with the positioning member in response further movement of the release member such that positioning member moves through two of the plurality of predetermined shift positions during a single progressive movement of the release member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 48 is an enlarged axial elevational view of the release member of the shift position releasing mechanism for the bicycle control device;

FIG. 49 is an enlarged side elevational view of the release member illustrated in FIG. 46;

FIG. 50 is an enlarged side elevational view of the release member illustrated in FIGS. 48 and 49;

FIG. 51 is a first enlarged axial elevational view of the first pawl driving member of the shift position releasing mechanism for the bicycle control device;

FIG. 52 is a first enlarged side elevational view of the first pawl driving member illustrated in FIG. 51;

FIG. 53 is an enlarged side elevational view of the first pawl driving member illustrated in FIGS. 51 and 52;

FIG. 54 is a second enlarged axial end elevational view of the first pawl driving member illustrated in FIGS. 51-53;

FIG. 55 is an enlarged axial elevational view of the pivot pin for pivotally supporting the first pawl driving member of the shift position releasing mechanism for the bicycle control device;

FIG. 56 is an enlarged side elevational view of the pivot pin illustrated in FIG. 55;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
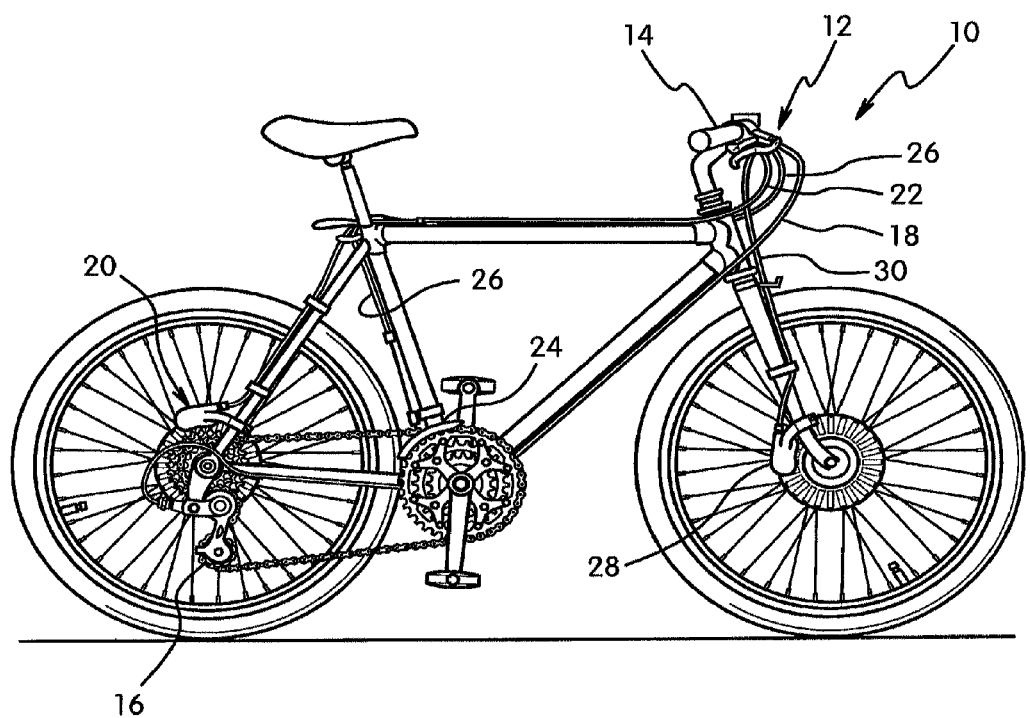
FIG. 1 is a side elevational view of a bicycle equipped with a pair of control devices (only one shown) in accordance with one embodiment of the present invention.

Referring initially to FIG. 1, a bicycle 10 is illustrated with a bicycle control device 12 mounted on a bicycle handlebar 14 in accordance with one embodiment of the present invention. The bicycle control device 12 is a right hand side control device 12 operated by the rider's right hand. The bicycle control device 12 is preferably operatively coupled to a rear derailleur 16 via a shift control cable 18 and to a front hydraulic brake device 28 via a hydraulic brake hose 30. This bicycle control device 12 is preferably a combined shift and brake control device that is configured and arranged to perform both a shifting operation and braking operation with a single lever as explained below. Alternatively, the bicycle control device 12 can be connected a rear hydraulic brake device 20 via a hydraulic brake hose 22, if needed and/or desired.

Preferably, the bicycle 10 includes a left hand side bicycle control device (not shown) that is substantially identical to the bicycle control device 12, except for the shifting unit has been modified to reduce the number of gears that can be shifted. Preferably, the left hand side bicycle control device is operatively coupled to a front derailleur 24 via a shift control cable 26 and the rear brake device 20 via the brake hose 22. Alternatively, if the hydraulic brake hose 22 connects the bicycle control device 12 to the hydraulic rear brake device 20 in an alternate embodiment, then the left hand side bicycle control device would be operatively coupled to the front brake device 28 via the hydraulic brake hose 30. In any event, the left hand side bicycle control device is essentially identical in construction and operation to the control device 12, except that it is a mirror image of the control device 12 and the number of shift positions for the left hand side bicycle control device is different. Thus, only the control device 12 will be discussed and illustrated herein.

Since most of the parts of the bicycle 10 are well known in the art, the parts of the bicycle 10 will not be discussed or illustrated in detail herein, except for the parts that relate to the present invention. In other words, only the parts related to the bicycle control device 12 will be discussed and illustrated in detail herein. Moreover, various conventional bicycle parts such as brakes, additional sprockets, derailleurs, etc., which are not illustrated and/or discussed in detail herein, can be used in conjunction with the present invention.

As used herein to describe the bicycle control device 12, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the bicycle control device 12 of the present invention.

Figure 2:
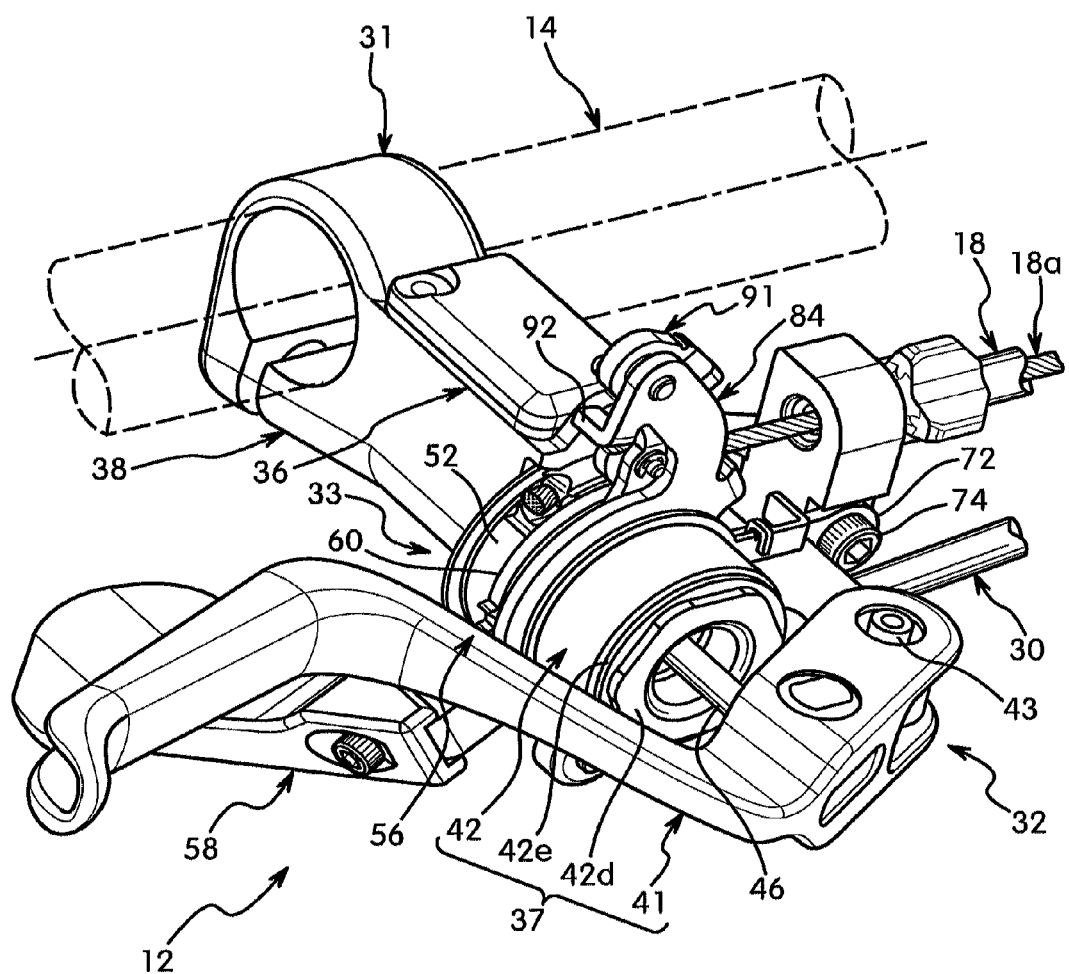
FIG. 2 is an enlarged perspective view of the bicycle control device illustrated in FIG. 1 in accordance with one embodiment of the present invention.
Figure 3:
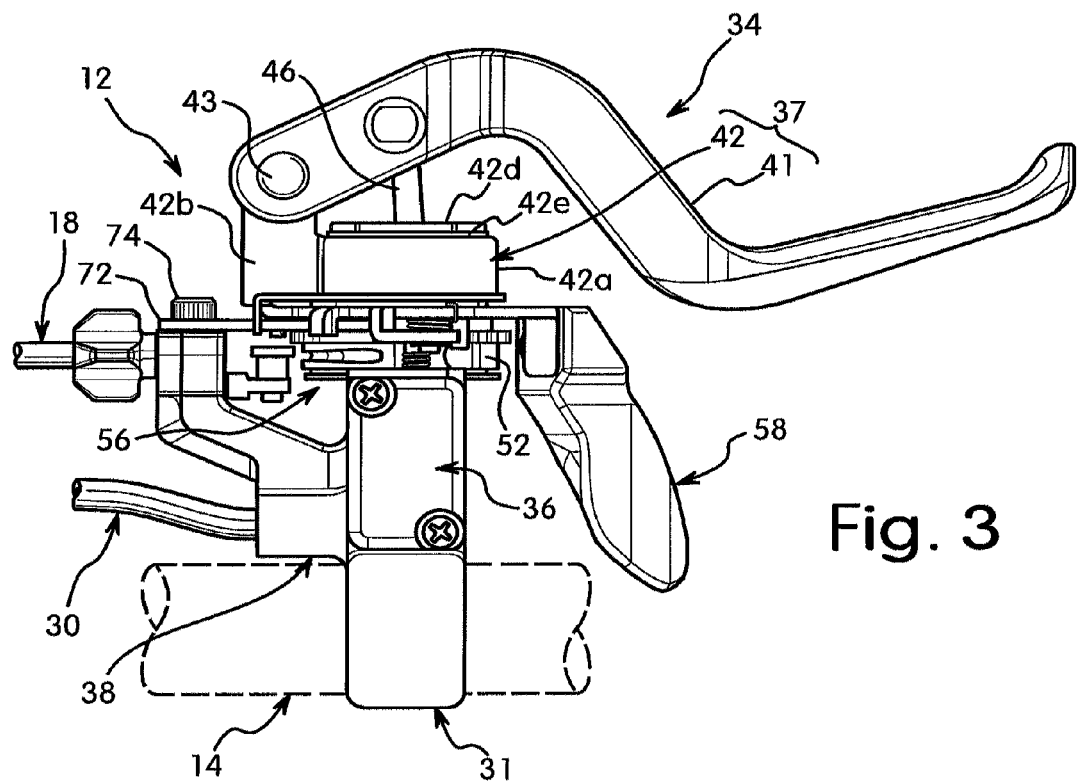
FIG. 3 is a top plan view of the bicycle control device illustrated in FIGS. 1 and 2 in accordance with one embodiment of the present invention.
Figure 4:
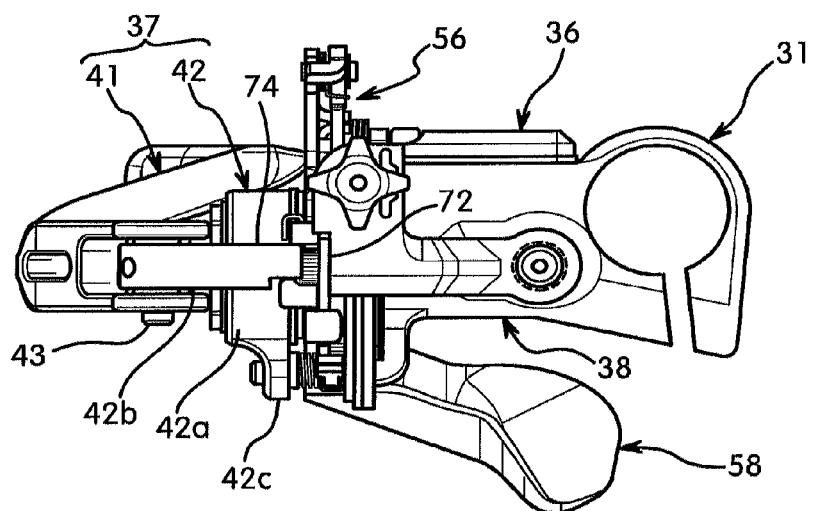
FIG. 4 is an inner side elevational view of the bicycle control device illustrated in FIGS. 1-3 in accordance with one embodiment of the present invention.
Figure 5:
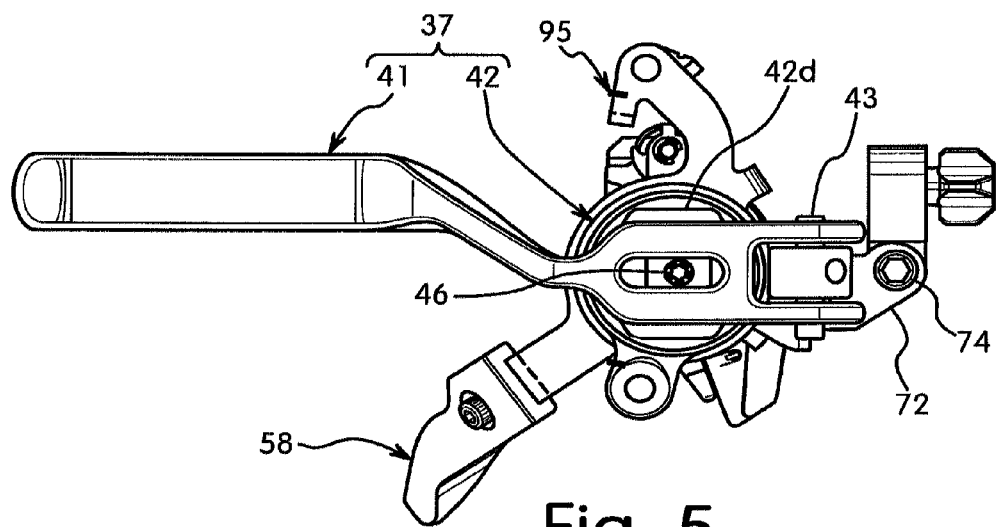
FIG. 5 is a front side elevational view of the bicycle control device illustrated in FIGS. 1-4 in accordance with one embodiment of the present invention.
Figure 6:
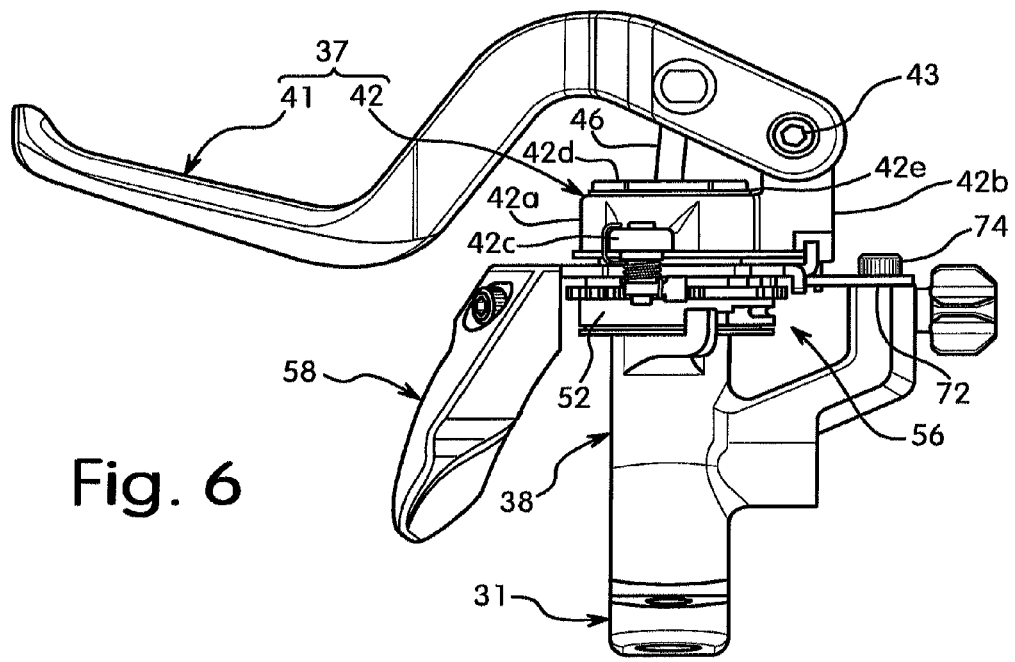
FIG. 6 is a bottom plan view of the bicycle control device illustrated in FIGS. 1-5 in accordance with one embodiment of the present invention.

Referring now to FIG. 2, the bicycle control device 12 basically includes a bicycle handlebar mounting portion or clamp 31, a braking unit 32 and a shifting unit 33. In this embodiment, the braking unit 32 and a shifting unit 33 are integrated into the mounting portion or clamp 31. The mounting portion or clamp 31 is preferably a split bore type of clamping arrangement in which the diameter of the bore is varied by a fixing bolt in a conventional manner. The mounting portion 31 is relatively conventional in construction thus will not be discussed or illustrated in further detail herein. Preferably, the mounting portion 31 is constructed of a hard light weight rigid material such as a light weight metal.

Figure 24:
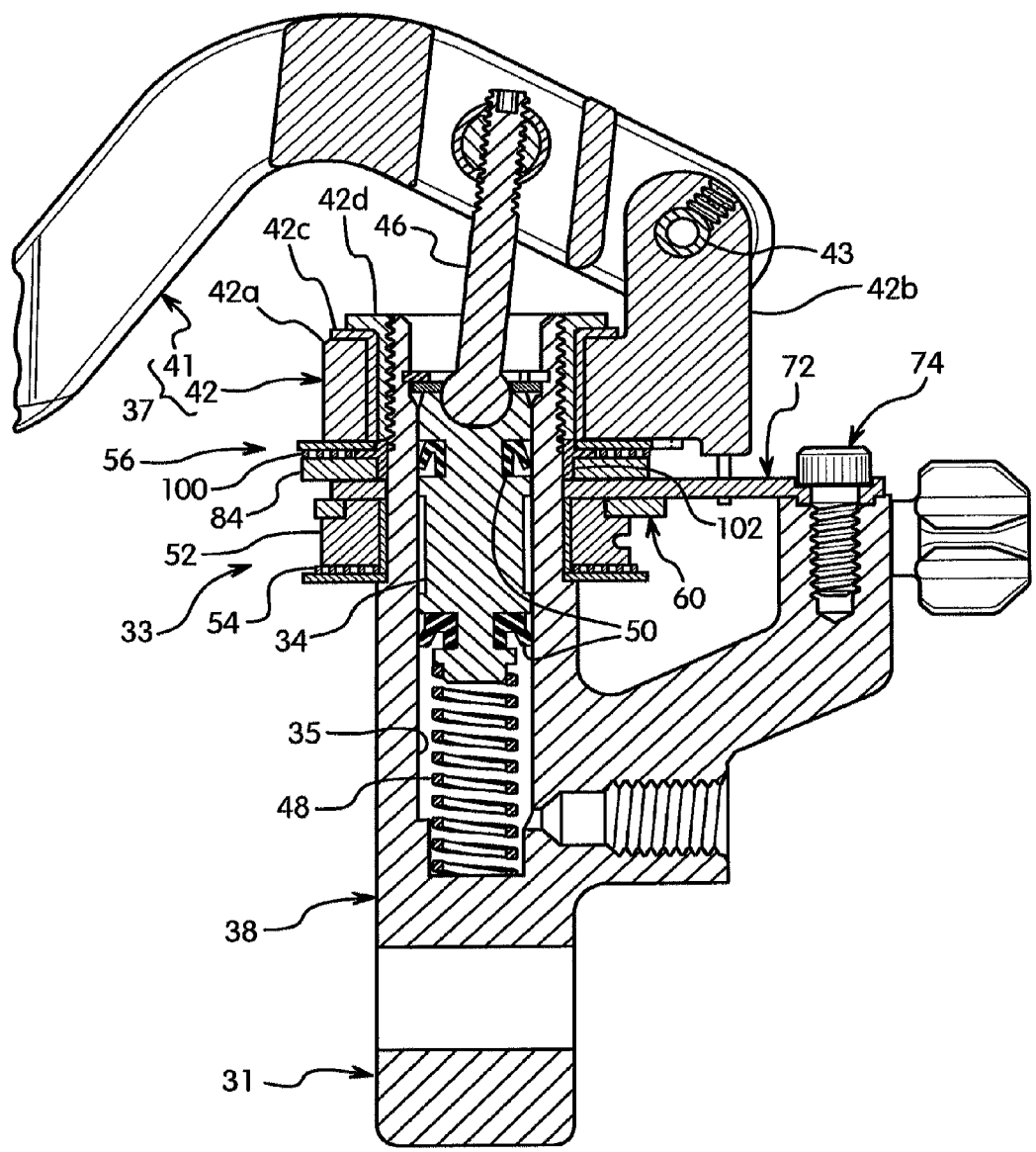
FIG. 24 is an enlarged cross sectional view of the bicycle control device as viewed along a plane bisecting the main operating lever and the master cylinder.
Figure 25:
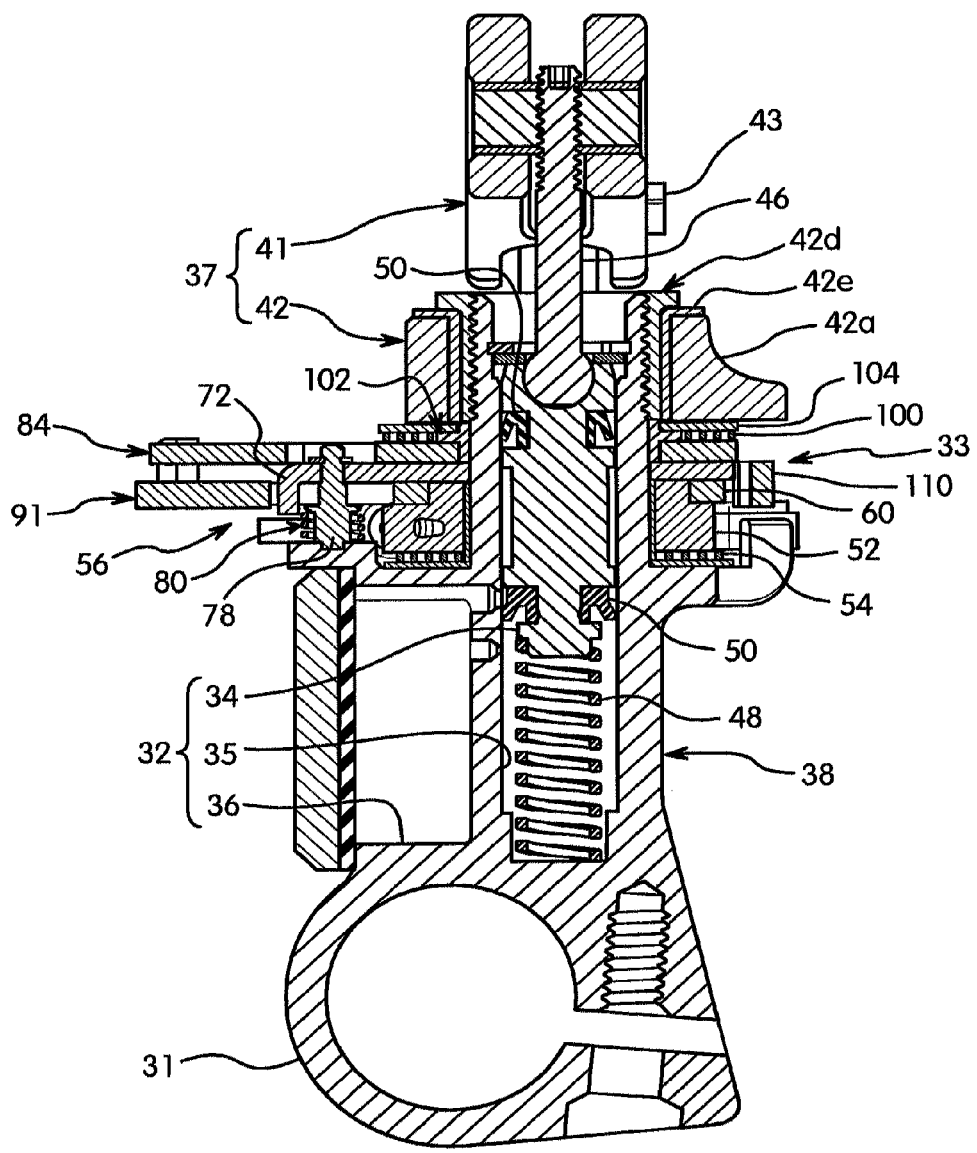
FIG. 25 is an enlarged cross sectional view of the bicycle control device as viewed along a plane bisecting the master cylinder and perpendicular to the longitudinal axis of the portion of the handlebar passing through the handlebar mounting portion.
Figure 26:
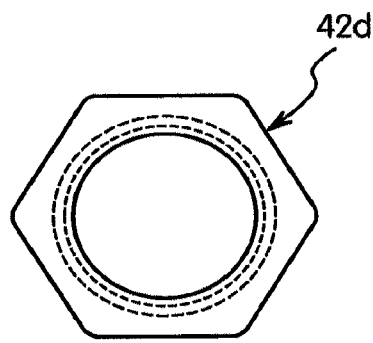
FIG. 26 is an enlarged axial elevational view of the nut for attaching the main operating member to the main support of the bicycle control device.
Figure 28:
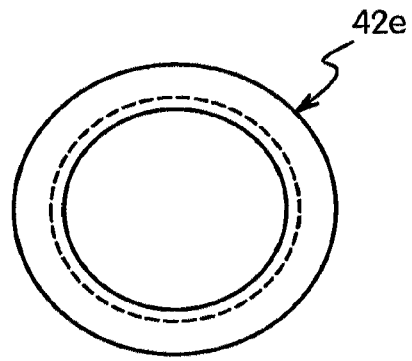
FIG. 28 is an enlarged axial elevational view of the cylindrical spacer for allowing rotation of the main operating member on the main support of the bicycle control device.
Figure 27:
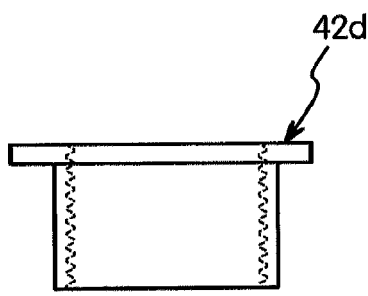
FIG. 27 is an enlarged side elevational view of the nut illustrated in FIG. 26 for attaching the main operating member to the main support of the bicycle control device.
Figure 29:
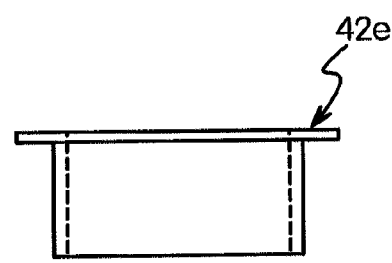
FIG. 29 is an enlarged side elevational view of the cylindrical spacer illustrated in FIG. 28 for allowing rotation of the main operating member on the main support of the bicycle control device.
Figure 30:
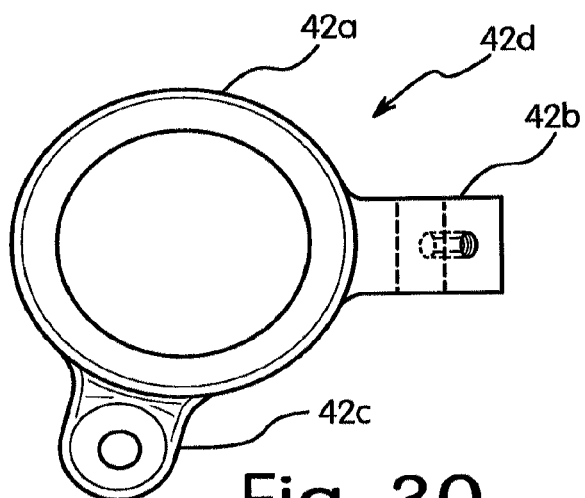
FIG. 30 is an enlarged outer end axial elevational view of the attachment member of the main operating member for supporting the operating member of the bicycle control device.
Figure 31:
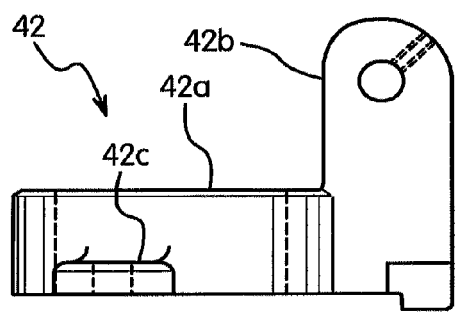
FIG. 31 is an enlarged side elevational view of the attachment member of the main operating member illustrated in FIG. 30 for supporting the operating member of the bicycle control device.
Figure 32:
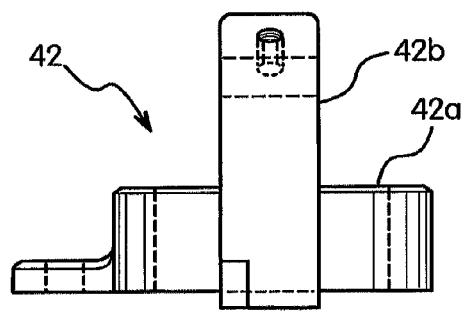
FIG. 32 is an enlarged side elevational view of the attachment member of the main operating member illustrated in FIGS. 30 and 31 for supporting the operating member of the bicycle control device.
Figure 33:
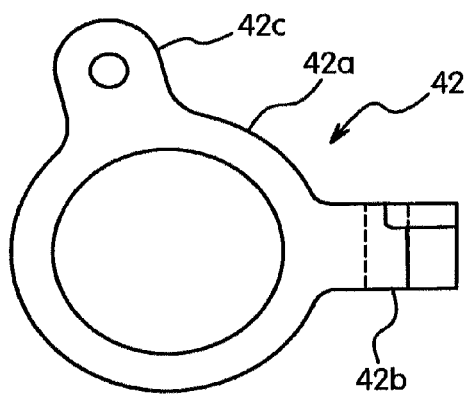
FIG. 33 is an enlarged inner end axial elevational view of the attachment member of the main operating member illustrated in FIGS. 30-32 for supporting the operating member of the bicycle control device.
Figure 34:
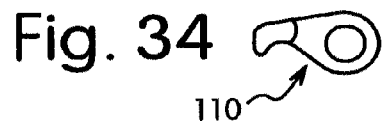
FIG. 34 is a first enlarged axial elevational view of the winding pawl for winding the positioning ratchet and the wire takeup member in a wire winding rotational direction in response to a downward movement of the operating lever the bicycle control device.
Figure 35:
FIG. 35 is an enlarged side elevational view of the winding pawl illustrated in FIG. 34.
Figure 36:
FIG. 36 is an enlarged side elevational view of the winding pawl illustrated in FIGS. 34 and 35.
Figure 37:
FIG. 37 is a second enlarged axial end elevational view of the winding pawl illustrated in FIGS. 34-36.
Figure 38:
FIG. 38 is an enlarged side elevational view of the winding pawl spring for apply an urging force to the winding pawl.
Figure 39:
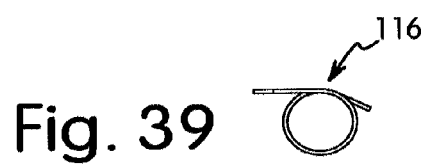
FIG. 39 is an enlarged axial end elevational view of the winding pawl spring illustrated in FIG. 38.

As best seen in FIGS. 24 and 25, the braking unit 32 basically includes a piston 34, a master cylinder 35 and a hydraulic reservoir 36. The braking unit 32 is selectively operated by a main operating member 37. This main operating member 37 also selectively operates the shifting unit 33. Thus, the braking unit 32 is a dual function operating member that functions as both a brake operating member and a main shift operating member. The main operating member 37 is configured and arranged to perform a braking operation when moved towards the handlebar 14 along a braking path or plane, and configured and arranged to perform a shifting operation when moved along a shifting path or plane that is perpendicularly arranged relative to the braking path or plane.

The reservoir 36 contains hydraulic fluid (mineral oil) which is pressurized by movement of the piston 34 in the master cylinder 35 in response to the pivotal movement of the main operating lever 41 towards the handlebar 14 along a braking path or plane. The pressurized hydraulic fluid then operates the hydraulic front brake device 28 in a conventional manner. Preferably, the hydraulic front brake device 28 is a conventional hydraulic disc brake. The parts of the front brake device 28 are relatively conventional, thus these parts and their operations will not be discussed or illustrated in detail herein. Likewise, preferably, the hydraulic rear brake device 20 is a conventional hydraulic disc brake, which will not be discussed or illustrated in detail herein. Alternatively, cable operated brake devices can be used to carry out certain aspects of the present invention by changing the braking unit 32 to a cable operated structure.

Preferably, the master cylinder 35 and the reservoir 36 are integrally formed with the mounting portion 31 as a one piece, unitary main support 38 as illustrated herein. The master cylinder 35 and the reservoir 36 are in fluid communication with each other for supplying pressurized fluid to the front brake device 28 to perform a braking operation in a conventional manner in response to operation of the main operating member 37.

The main operating member 37 is attached to the master cylinder 35 to rotate about the center cylinder axis of the master cylinder 35 when a shifting operation is being performed. Preferably, the main operating member 37 includes the main operating lever 41 and an attachment member or ring 42. The main operating lever 41 is pivotally mounted to the attachment member 42 by a pivot pin 43 such that the main operating lever 41 move along a braking path that is defined by a braking plane extending in a direction perpendicular to the pivot axis of the pivot pin 43. The pivot pin 43 is arranged such that the pivot axis of the pivot pin 43 extends in a direction perpendicular to the center cylinder axis of the master cylinder 35. The attachment member or ring 42 is mounted on the exterior surface of the master cylinder 35. The attachment member or ring 42 is configured to rotate about the center cylinder axis of the master cylinder 35 along a shifting path that is defined by a shifting plane extending in a direction perpendicular to the braking plane of the braking path. Thus, the main operating lever 41 is used as both a braking lever and a shifting lever.

Referring now to FIGS. 24-33, the main operating member 37 and is attachment to the main support 38 will now be discussed. As seen in FIGS. 24 and 25, the main operating member 37 is mounted in a rotatable manner to the master cylinder 35. As best seen in FIGS. 30-33, the attachment member 42 has a rotating ring section 42a, a lever mounting section 42b and a pawl mounting flange 42c. Basically, the rotating ring section 42a is mounted around the master cylinder 35 and secured thereto by a hat shaped nut 42d (FIGS. 24-27). Preferably, as seen in FIGS. 24, 25 and 28 and 29, a hat shaped spacing washer 42e is disposed between the nut 42d and the rotating ring section 42a of the attachment member 42 so that the attachment member 42 can be rotated around the center cylinder axis of the master cylinder 35 by applying a generally upward force or a generally downward force to the free end of the main operating lever 41.

The main operating member 37 further includes a connecting rod 46 that is connected between intermediate portion of the main operating lever 41 and the piston 34. Thus, when the main operating lever 41 is moved along the braking path or plane that is arranged perpendicular to the pivot axis of the pivot pin 43, the piston 34 is moved within the master cylinder 35 to perform a braking operation.

In particular, as best seen in FIGS. 24 and 25, the piston 34 is slidably located in the master cylinder 35 to actuate the front braking device 28. Preferably, the piston 34 is biased outwardly by a compression spring 48 that is disposed within the master cylinder 35 and that contacts the inner end of the piston 34. Thus, the main operating lever 41 is normally biased to a non-braking position by the compression spring 48 that acts on the piston 34, which in turn act on the connecting rod 46 that is connected to the main operating lever 41. The piston 34 preferably includes a pair of annular sealing rings 50 such that the hydraulic fluid (mineral oil) is retained within the master cylinder 35 and the reservoir 36. The operation of the master cylinder 35 and the piston 34 are relatively conventional, thus these parts and operations will not be discussed or illustrated in detail herein.

As best seen in FIGS. 2-7, 24 and 25, the shifting unit 33 is basically mounted around the center cylinder axis of the master cylinder 35 to provide a compact structure. Moreover, with this arrangement, the main operating lever 41 also acts as a shift lever of the shifting unit 33 as explained below. Thus, the shifting unit 33 basically includes the main operating member 37, discussed above, as well as a wire takeup member 52, a wire takeup biasing member or spring 54, a shift wire position control mechanism 56 and a secondary operating member or lever 58. This arrangement of the shifting unit 33 allows the rider to shift the rear gears up or down regardless of the rider's hand position on the handlebar 14.

As seen in FIGS. 8-13, the main operating lever 41 of the main operating member 37 is pushed generally in a downward direction to perform an upshifting operation. When the rider pushes the main operating lever 41 generally in a downward direction, the inner wire 18a is pulled to wind the inner wire 18a on the outer peripheral edge of the wire takeup member 52. This inner wire pulling movement of the inner wire 18a operates the rear derailleur 16 to move the chain outwardly relatively to the center plane of the bicycle 10, such that the chain moves from an inner gear or sprocket to an outer gear or sprocket.

On the other hand, as seen in FIGS. 14-18, when the main operating lever 41 of the main operating member 37 is moved in a generally upward direction, a downshifting operation is performed. When the rider pushes the main operating lever 41 generally in an upward direction, the inner wire 18a is released to unwind the inner wire 18a from the outer peripheral edge of the wire takeup member 52. This inner wire releasing movement of the inner wire 18a operates the rear derailleur 16 to move the chain inwardly relatively to the center plane of the bicycle 10, such that the chain moves from an outer gear or sprocket to an inner gear or a sprocket.

As seen in FIGS. 19-23, the secondary operating member 58 is a release lever that operates in the same manner as the main operating lever 41 when the main operating lever 41 is pushed upwardly to perform a downshifting operation. Thus, when the rider pushes the secondary operating member 58 generally in an upward direction, the inner wire 18a is released to unwind the inner wire 18a from the outer peripheral edge of the wire takeup member 52. This inner wire releasing movement of the inner wire 18a operates the rear derailleur 16 to move the chain inwardly relatively to the center plane of the bicycle 10, such that the chain moves from an outer gear or sprocket to an inner gear or a sprocket.

Figure 7:
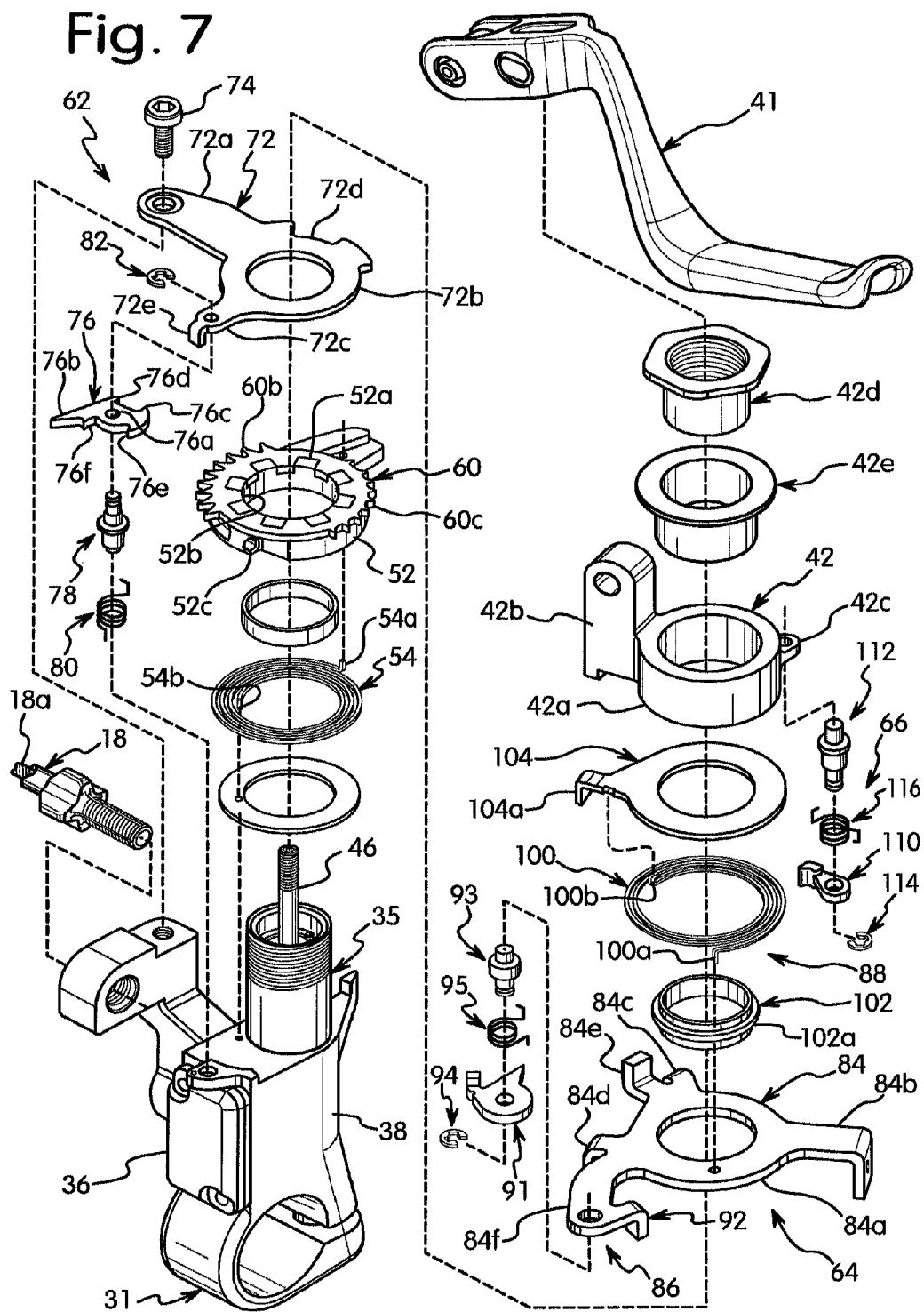
FIG. 7 is an exploded perspective view of the bicycle control device illustrated in FIGS. 1-6 in accordance with one embodiment of the present invention.

As best seen in FIGS. 7, 24 and 25, the wire takeup member 52 is basically a ring shaped member that is rotatably mounted around the master cylinder 35 such that the wire takeup member 52 has its center pivot axis coinciding with the center cylinder axis of the master cylinder 35. The wire takeup member 52 is a one piece unitary member made from a hard, rigid plastic material.

As best seen in FIGS. 65-68, the wire takeup member 52 has a plurality of projections 52a that surround a center opening 52b and a cable attachment point 52c located on its peripheral surface. The inner wire 18a of the rear shift cable 18 is attached at one to the cable attachment point 52c and at the other end to the rear derailleur 16. Thus, the inner wire 18a is wound around the periphery of the wire takeup member 52 when the inner wire 18a is being pulled, as seen in FIGS. 8-13, to operate the rear derailleur 16.

As best seen in FIG. 7, the wire takeup biasing member 54 is a coiled torsion spring that has one end 54a located in a hole of the wire takeup member 52 and a second end 54b located in a hole formed in the main support 38 that forms the housing of the reservoir 36. Thus, the wire takeup member 52 is biased in a first rotational direction about the rotational shift axis that is coincident with the center cylinder axis of the master cylinder 35. As viewed in FIGS. 8-23, the wire takeup biasing member 54 urges the wire takeup member 52 in a clockwise direction about rotational shift axis. When the bicycle control device 12 is in the normal rest position, the wire takeup member 52 is preloaded to maintain the shift position.

Still referring to FIGS. 7, 24 and 25, the shift position control mechanism 56 is mounted around the master cylinder 35 for controlling the position of the wire takeup member 52 and thus, controlling the shift position of the rear derailleur 16. Preferably, the shift position control mechanism 56 includes a shift positioning member or ratchet 60, a shift position maintaining mechanism 62, a shift position releasing mechanism 64, and a shift position winding mechanism 66.

The positioning ratchet 60 is basically configured and arranged to include a plurality of predetermined shift positions. The positioning ratchet 60 is designed to move the wire takeup member 52 around the rotational shift axis of the of the bicycle control device 12. When the positioning ratchet 60 is moved in a first rotational direction around the rotational shift axis, the wire takeup member 52 releases the inner wire 18*a*. During an inner wire release operation, the wire takeup member 52 and the positioning ratchet 60 are rotated in the first rotational direction by the urging force of the wire takeup biasing member 54. On the other hand, when the shift positioning ratchet 60 is moved in a second rotational direction around the rotational shift axis, opposite rotational direction, the wire takeup member 52 is moved against the urging force of the wire takeup biasing member 54 to pull the inner wire 18*a*. This wire pulling operation is accomplished by moving the main operating lever 41 in a downward direction to actuate the shift position winding mechanism 66.

Preferably, the positioning ratchet 60 is in the form of a positioning plate. The positioning ratchet 60 is preferably constructed of a hard rigid material such as a metal material or other suitable material. The positioning ratchet 60 is fixedly mounted to the wire takeup member 52 so that the wire takeup member 52 and the positioning ratchet 60 rotate together as best seen in FIGS. 7 and 65-68. In particular, the positioning ratchet 60 is preferably a ring shaped member having an inner peripheral opening 60*a* with notches that engage the projections 52*a* on the wire takeup member 52 to non-rotatably fix the positioning ratchet 60 on the wire takeup member 52 as seen in FIGS. 65-68.

The outer peripheral edge of the positioning ratchet 60 preferably include a set of shift positioning teeth 60*b* and a set of shift driving teeth 60*c*. The shift positioning teeth 60*b* are configured and arranged to engage the shift position maintaining mechanism 62, as discussed below, while the shift driving teeth 60*c* are configured and arranged to engage the shift position winding mechanism 66 as discussed below. Accordingly, movement of the main operating lever 41 along the shifting path causes the positioning ratchet 60 to rotate via either the position releasing mechanism 64 or the shift position winding mechanism 66 acting on the shift position maintaining mechanism 62 as discussed below.

Preferably, the shift position maintaining mechanism 62 basically includes a mounting bracket 72, a mounting bolt 74, a position maintaining pawl 76, and a positioning pawl mounting pin 78, a positioning pawl biasing member 80 and a retaining clip 82. The shift position maintaining mechanism 62 is configured and arrange to engage the shift positioning teeth 60*b* of the of the positioning ratchet 60 for maintaining the wire takeup member 52 in one of a plurality of predetermined shift positions. In particular, the position maintaining pawl 76 is selectively disengaged from the positioning ratchet 60 to allow the wire takeup member 52 to move between individual shift positions by operation of either the position releasing mechanism 64 or the shift position winding mechanism 66 as explained below.

The mounting bracket 72 is fixedly attached to the main support 38 of the bicycle control device 12 by the mounting bolt 74. Preferably, the mounting bracket 72 is a flat metal plate that is stamped from flat piece of sheet metal. The mounting bracket 72 not only secures various parts of the shift position maintaining mechanism 62 to the main support 38, but also has additional controlling functions as explained below.

Figure 8:
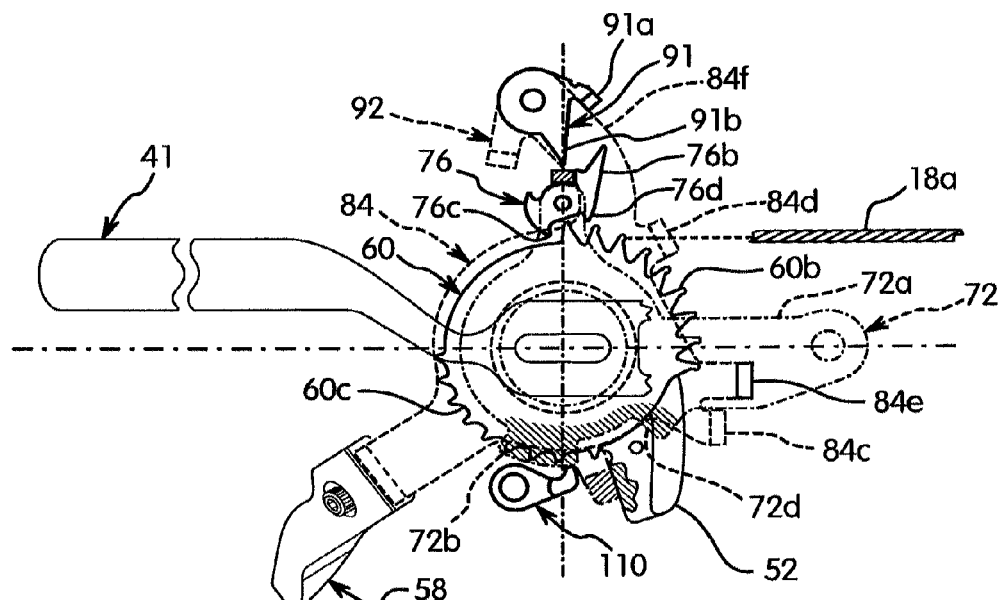
FIG. 8 is a simplified front side elevational view of the bicycle control device illustrated in FIGS. 1-6 with the selected parts removed to show the main operating lever, the secondary operating (release) lever and the shift position control mechanism in their normal rest positions with the inner wire of the rear shift cable fully withdrawn from the wire takeup member.
Figure 57:
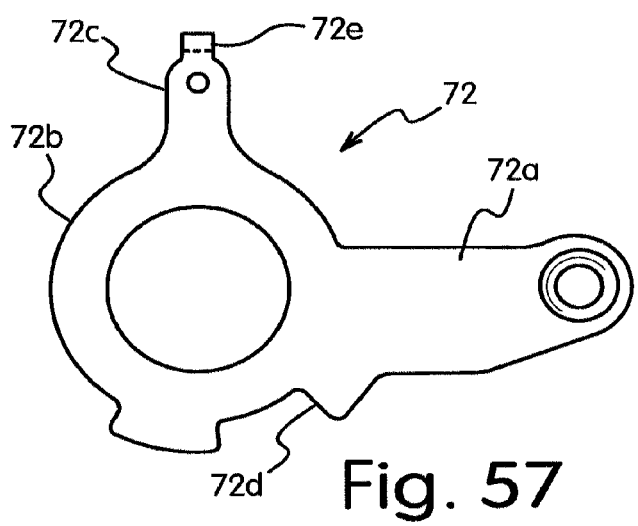
FIG. 57 is an enlarged axial elevational view of the mounting bracket of the shift position maintaining mechanism for the bicycle control device.
Figure 58:
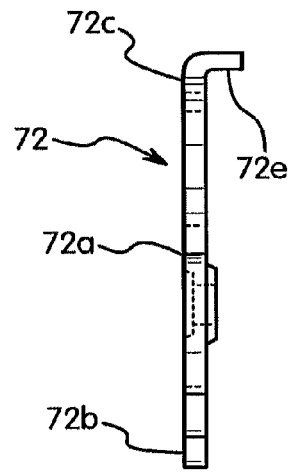
FIG. 58 is a first enlarged side elevational view of the mounting bracket illustrated in FIG. 57.
Figure 59:
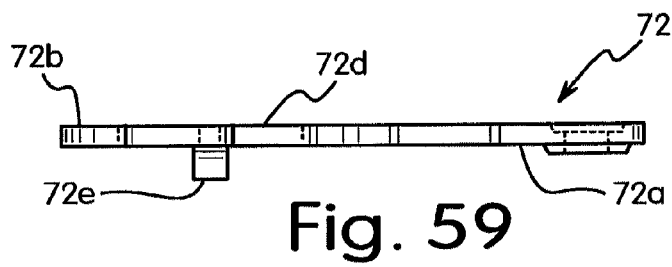
FIG. 59 is a second enlarged side elevational view of the mounting bracket illustrated in FIGS. 57 and 58.

Basically, as seen in FIGS. 57-59, the mounting bracket 72 has an attachment portion 72*a*, a ring portion 72*b* and a pawl mounting tab 72*c* that are all formed as a one-piece, unitary member. The attachment portion 72*a* has a hole for receiving the mounting bolt 74 to attach the mounting bracket 72 to the main support 38 of the bicycle control device 12 as seen in FIGS. 2-7. The ring portion 72*b* is formed on the inner end of the attachment portion 72*a* and has a central opening for receiving the master cylinder 35 therethrough. The outer peripheral edge of the ring portion 72*b* has the pawl mounting tab 72*c* extending radially outwardly therefrom such that the attachment portion 72*a* and the pawl mounting tab 72*c* are perpendicularly arranged. The peripheral edge of the ring portion 72*b* also includes a notch 72*d* that is configured and arranged for exposing the shift driving teeth 60*c* of the positioning ratchet 60 to the shift position winding mechanism 66 as discussed below. Moreover, the peripheral edge of the ring portion 72*b* that is adjacent to the notch 72*d* acts as a winding pawl holding member that maintains the shift position winding mechanisms 66 out of engagement from the shift driving teeth 60*c* of the positioning ratchet 60 when the main operating lever 41 in its rest position as seen in FIG. 8.

The position maintaining pawl 76 is pivotally mounted between the main support 38 and the pawl mounting tab 72*c* via the pawl mounting pin 78 and the clip 82. In other words, the position maintaining pawl 76 is pivotally mounted about the longitudinal axis of the mounting pin 78 for selectively engaging the shift positioning teeth 60*b* of the positioning ratchet 60. The pawl mounting tab 72*c* has a bent end portion or stop 72*e* that limits rotational movement of the position maintaining pawl 76 about the pivot axis of the pawl mounting pin 78.

Figure 60:
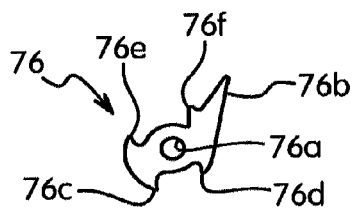
FIG. 60 is an enlarged axial elevational view of the position maintaining pawl of the shift position releasing mechanism for the bicycle control device.
Figure 61:
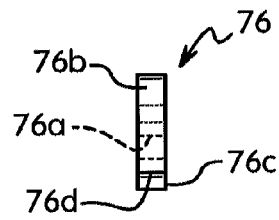
FIG. 61 is a first enlarged side elevational view of the position maintaining pawl illustrated in FIG. 60.
Figure 62:
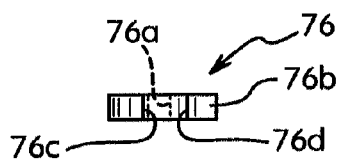
FIG. 62 is a second enlarged side elevational view of the position maintaining pawl illustrated in FIGS. 60 and 61.

As best seen in FIGS. 60-62, the position maintaining pawl 76 has a mounting hole 76*a*, an operating flange 76*b*, a first position maintaining tooth 76*c*, a second position maintaining tooth 76*d*, a first stop surface 76*e* and a second stop surface 76*f*. The mounting hole 76*a* is configured and arranged to receive a portion of a pawl mounting pin 78 such that the position maintaining pawl 76 can pivot around the axis of the pawl mounting pin 78. The movement of the position maintaining pawl 76 is basically controlled by the operating flange 76*b* that is selectively engaged by the shift position releasing mechanism 64 as discussed below.

The first and second shift position maintaining teeth 76*c* and 76*d* are configured and arranged to selectively engage and selectively disengage the shift positioning teeth 60*b* of the positioning ratchet 60 to control the rotational movement of the wire takeup member 52. As explained below, the position maintaining teeth 76*c* and 76*d* are configured such that the inner wire 18*a* is wound by the main operating lever 41 by one or multiple shift positions at a time when the main operating lever 41 is moved in a generally downward direction along the shifting path. The shift positioning maintaining teeth 76*c* and 76*d* are further configured and arranged to provide either a single or a double shift when the inner wire 18*a* is being released by a generally upward movement of either the main operating lever 41 or the secondary operating lever 58 along the shifting path.

The stops 76*e* and 76*f* of the position maintaining pawl 76 are configured and arranged to engage the stop 72*e* of the mounting bracket 72. Thus, the range of pivotal movement of the position maintaining pawl 76 is limited through a predetermined rotational arc. More particularly, the stops 76*e* and 76*f* are configured and arranged such that the position maintaining pawl 76 can rock back and forth so that the shift positioning maintaining teeth 76*c* and 76*d* are alternately engaged with the positioning teeth 60*b* of the positioning ratchet 60 to control the rotational movement of the wire takeup member 52.

Figure 63:
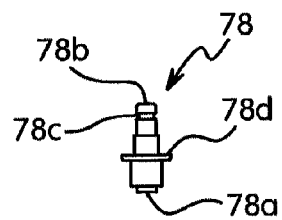
FIG. 63 is an enlarged axial elevational view of the positioning pivot pin for pivotally supporting the positioning of the shift position releasing mechanism for the bicycle control device.
Figure 64:
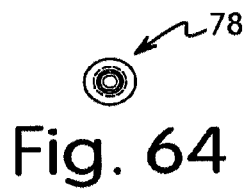
FIG. 64 is an enlarged side elevational view of the positioning pivot pin illustrated in FIG. 63.
Figure 65:
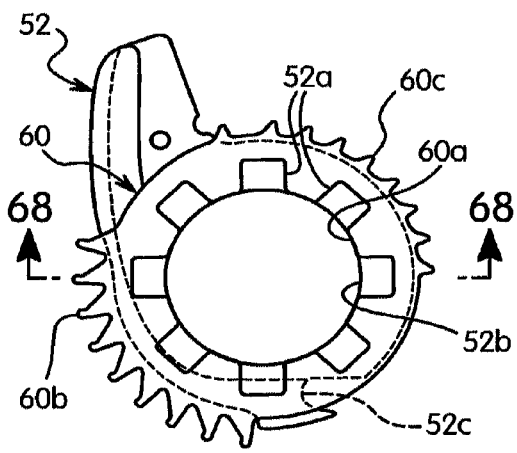
FIG. 65 is a first enlarged axial end elevational view of the wire takeup member and the positioning ratchet for the bicycle control device.
Figure 66:
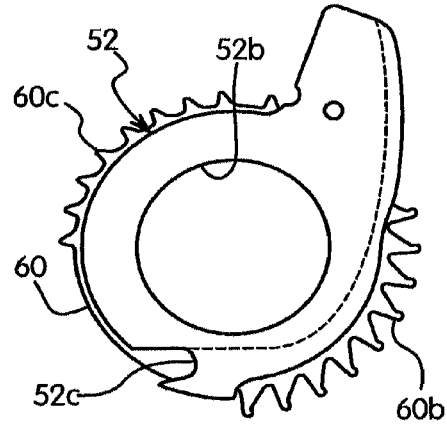
FIG. 66 is a second enlarged axial end elevational view of the wire takeup member and the positioning ratchet illustrated in FIG. 65.
Figure 67:
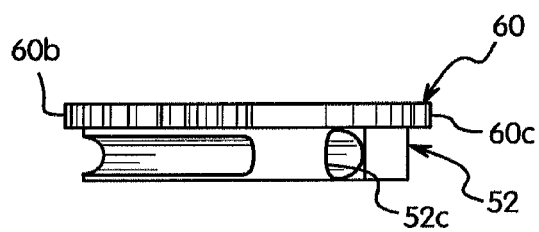
FIG. 67 is an enlarged side elevational view of the wire takeup member and the positioning ratchet illustrated in FIGS. 65 and 66.
Figure 68:
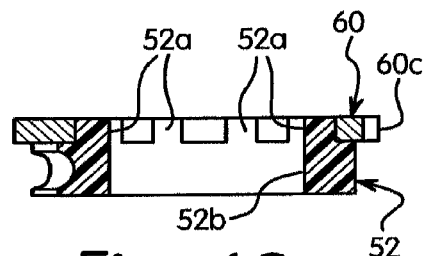
FIG. 68 is a cross sectional view of the wire takeup member and the positioning ratchet as seen along section line 68-68 of FIG. 65.
Figure 69:
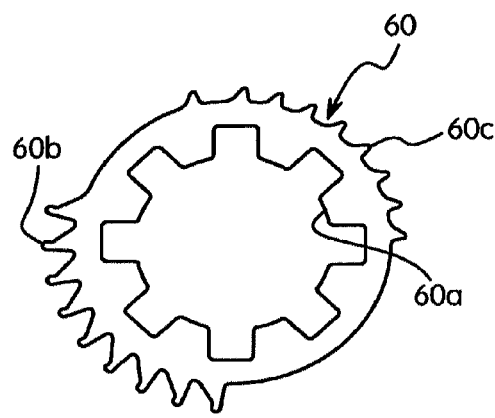
FIG. 69 is an enlarged axial end elevational view of the positioning ratchet for the bicycle control device.
Figure 70:
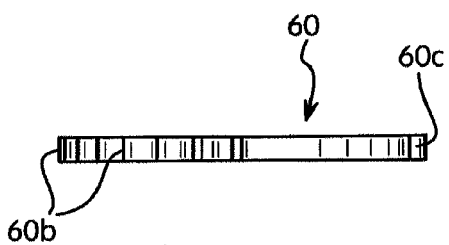
FIG. 70 is an enlarged side elevational view of the positioning ratchet illustrated in FIG. 69.

As best seen in FIGS. 7, 63 and 64, the mounting pin 78 is a step shaped pin that has a first end 78*a* that is received in a mounting hole of the main support 38 and a second end 78*b* that is received through the hole 76*a* of the position maintaining pawl 76 and the hole formed in the stop 72*e* of the mounting bracket 72. The mounting pin 78 further includes an annular groove 78c for receiving the clip 82 therein. An annular flange 78d is provided in a middle portion of the pin for limiting the axial movement the positioning pawl biasing member 80 that is mounted on the mounting pin 78.

The positioning pawl biasing member 80 is preferably a torsion spring that has a first end engaging the main support 38 and a second end engaging the position maintaining pawl 76 such that the position maintaining pawl 76 is normally biased in a direction such that the first position maintaining tooth 76c is engaged with one of the shift positioning teeth 60b.

Preferably, as best seen in FIG. 7, the shift position releasing mechanism 64 basically includes an inner wire release member 84 with a driving arrangement 86, and a biasing arrangement 88 that acts on the release member 84. The shift position releasing mechanism 64 is configured and arranged such that rotational movement of the release member 84 moves the position maintaining pawl 76 into and out of engagement with the shift positioning teeth 60b of the positioning ratchet 60. This movement of the position maintaining pawl 76 by the release member 84 causes the inner wire 18a of the rear shift cable 18 to be released by one or two shift positions utilizing a single progressive movement of the release member 84.

The release member 84 is mounted about the master cylinder 35 to rotate around the center cylinder axis of the master cylinder 35 in response to upward movement of either the main operating lever 41 or the secondary operating (releasing) lever 58. Of course, it will be apparent to those skilled in the art from this disclosure that the secondary operating lever 58 can be removed if needed or desired. Preferably, the release member 84 is constructed of a hard rigid material that is configured to the shape as shown in the preferred embodiment. For example, the release member 84 can be constructed by stamping a single sheet of metal material.

As seen in FIGS. 48-50, the release member 84 preferably includes a ring mounting portion 84a, a secondary release lever attachment flange 84b, a first stop flange 84c, a second stop flange 84d, a third stop flange 84e and a pawl driving support portion 84f. The ring mounting portion 84a has a center opening that is mounted on the master cylinder 35. The secondary release lever attachment flange 84b extends outwardly in a generally radial direction from the ring mounting portion 84a. The secondary operating lever 58 is fixedly coupled to the secondary release lever attachment flange 84b such that the release member 84 can be rotated by upward movement of the secondary operating lever 58.

The stop flanges 84c and 84d are bent downwardly from the ring mounting portion 84a in a first axial direction, and are configured and arranged to limit the rotational movement of the release member 84. More specifically, the stop flanges 84c and 84d are configured and arranged to abut opposite sides of the attachment portion 72a of the mounting bracket 72 such that the range of the rotational movement of the release member 84 is limited.

The stop flange 84e of the release member 84 is bent to extend in the opposite axial direction form the stop flanges 84c and 84d. The stop flange 84e is configured and arranged to contact the mounting section 42b of the attachment member 42. More specifically, when the release member 84 is in its rest position, the first stop flange 84c contacts the attachment portion 72a of the mounting bracket 72 and the stop flange 84e contacts the mounting section 42b so that the main operating lever 41 is maintained in a rest position.

The pawl driving support portion 84f supports part of the pawl driving arrangement 86. In particular, the pawl driving arrangement 86 has a first pawl driving member 91 (FIGS. 51-54) pivotally mounted to the pawl driving support portion 84f and a second pawl driving member 92 (FIGS. 48-50) that is integrally formed as part of the pawl driving support portion 84f. The first and second pawl driving members 91 and 92 are configured and arranged to move the position maintaining pawl 76 into and out of engagement with the shift positioning teeth 60b of the positioning ratchet 60. More specifically, the first pawl driving member 91 is configured and arranged such that when either one of the operating levers 41 and 58 are moved about half way through its full range of pivotal movement, then the position maintaining pawl 76 is rotated against the urging force of the positioning pawl biasing member 80 such that the positioning ratchet 60 rotates in a wire releasing direction to allow a single shift to occur. When one of the operating levers 41 and 58 are fully rotated through their full range of pivotal movement, then the first and second pawl driving members 91 and 92 sequentially contact and move the position maintaining pawl 76 such that the positioning ratchet 60 can rotate in a wire releasing direction to allow two shifts to occur in a single progressive movement of one of the operating levers 41 and 58.

In the preferred embodiment, the first pawl driving member 91 is mounted to the pawl driving support portion 84f of the release member 84 by a pivot pin 93 (FIGS. 7, 55 and 56) and a retaining clip 94 (FIG. 7). A return spring or biasing member 95, as seen in FIG. 7, is mounted on the pivot pin 93 to maintain the first pawl driving member 91 in a predetermined orientation to contact the position maintaining pawl 76 when the release member 84 is rotated. One end of the biasing member 95 engages in the first pawl driving member 91, while the second end of the biasing member 95 engages the pawl driving support portion 84f so that the first pawl driving member 91 is held in a predetermined orientation.

Figure 13:
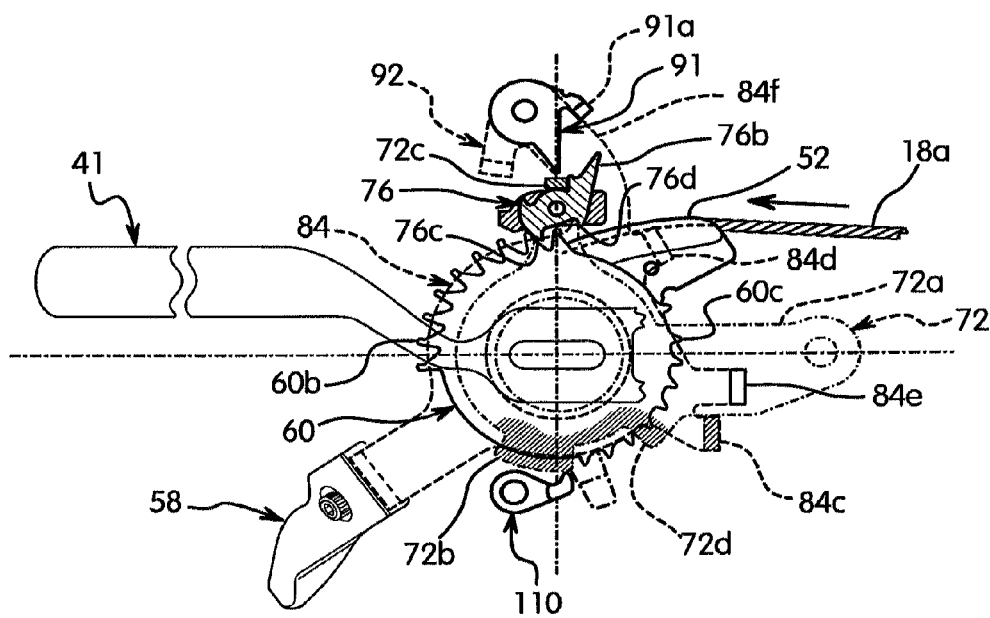
FIG. 13 is a simplified front side elevational view of the bicycle control device in which the main operating lever, the secondary operating (release) lever and the shift position control mechanism are in their normal rest positions when the inner wire of the rear shift cable is fully retracted by the wire takeup member.
Figure 14:
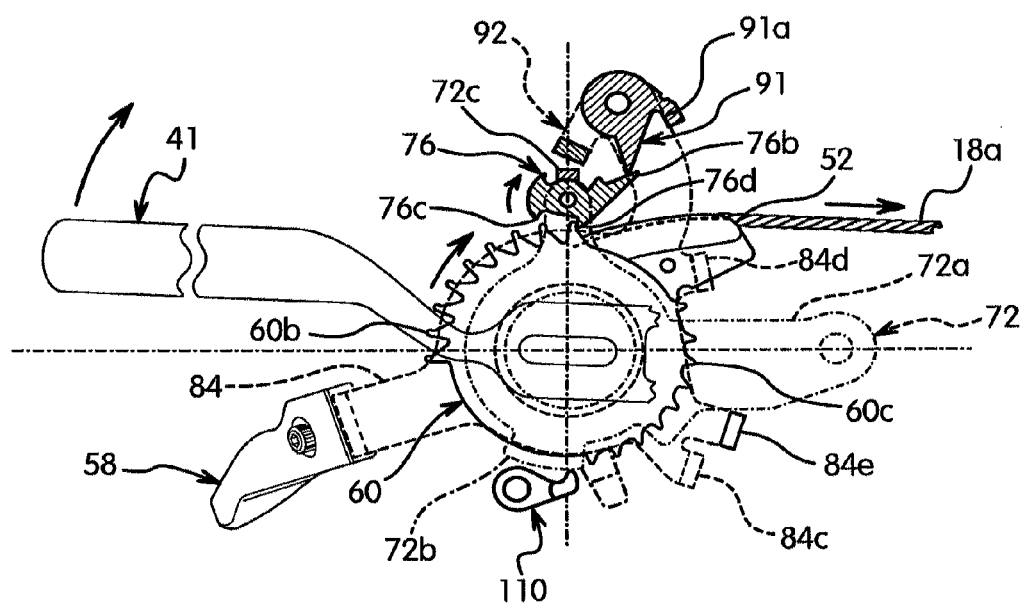
FIG. 14 is a simplified front side elevational view of the bicycle control device, similar to FIG. 13, but with the main operating lever moved in a clockwise direction to move the release member such that the position maintaining pawl is moved by the first pawl driving member to allow the positioning ratchet to move slightly in a clockwise direction from the position of FIG. 13.
Figure 15:
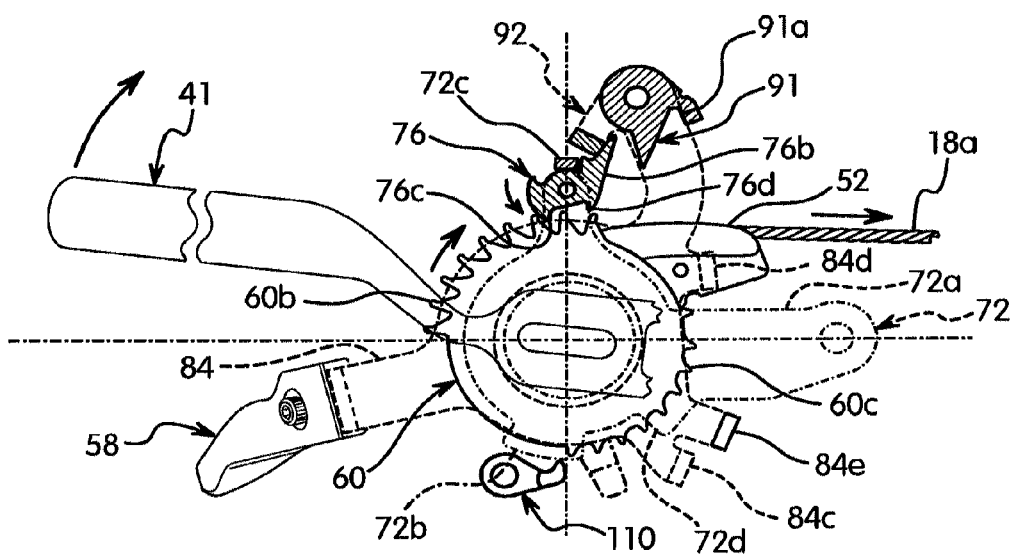
FIG. 15 is a simplified front side elevational view of the bicycle control device, in which the main operating lever has been moved further from the position shown in FIG. 14 such that the first pawl driving member releases the position maintaining pawl and the positioning ratchet moves further in a clockwise direction from the position of FIG. 14.
Figure 16:
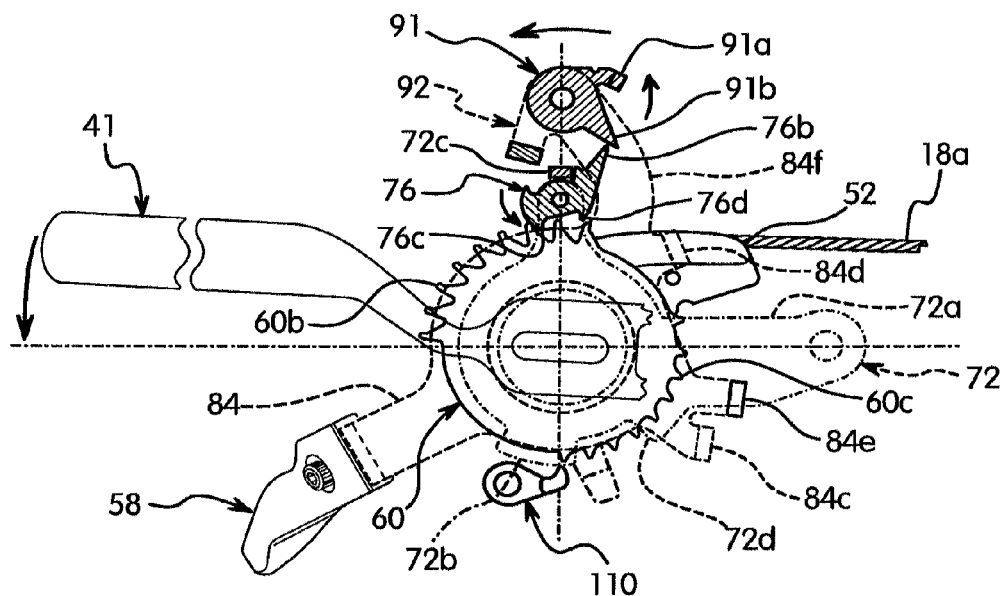
FIG. 16 is a simplified front side elevational view of the bicycle control device in which the main operating lever has been released from the position shown in FIG. 15 to rotate in a counterclockwise direction back to its normal rest position such that the positioning ratchet has only moved one shift position.
Figure 21:
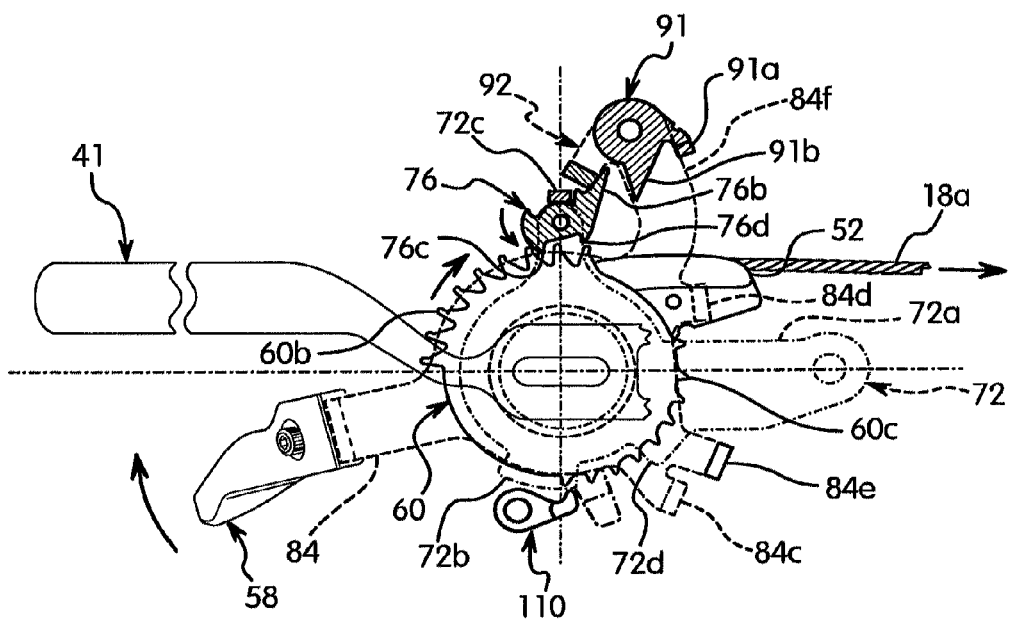
FIG. 21 is a simplified front side elevational view of the bicycle control device, in which the secondary operating (release) lever has been moved further from the position shown in FIG. 20 such that the first pawl driving member releases the position maintaining pawl and the positioning ratchet moves further in a clockwise direction from the position of FIG. 14.

More specifically, the first pawl driving member 91 has a stop 91a that contacts the pawl driving support portion 84f to maintain the first pawl driving member 91 in the predetermined orientation by an urging force of the biasing member 95. The first pawl driving member 91 further includes a projection 91b that extends in a substantially radial direction towards the center cylinder axis of the master cylinder 35 when the release member 84 is in the rest position. The first pawl driving member 91 is positioned radially outwardly of the position maintaining pawl 76 relative to the rotational axis of the shifting unit 33. However, the projection 91b of the first pawl driving member 91 extends radially inwardly towards the center cylinder axis such that when the release member 84 is rotated around the master cylinder 35, then the projection 91b of the first pawl driving member 91 contacts the operating flange 76b of the position maintaining pawl 76 as best seen in FIGS. 13, 14 and 16. More specifically, when the release member 84 is rotated in a wire releasing rotational direction, then the projection 91b of the first pawl driving member 91 contacts the operating flange 76b of the position maintaining pawl 76 to rotate the position maintaining pawl 76 against the urging force of the positioning pawl biasing member 80 as best seen in FIGS. 14 and 16. The first pawl driving member 91 is prevented from rotating about the pivot pin 93 when the release member 84 is moved in the wire releasing direction because the stop 91a contacts the pawl driving support portion 84f. However, when the release member 84 returns to its original rest position due to the biasing arrangement 88 or the release member 84 is moved past the position maintaining pawl 76, then the first pawl driving member 91 can rotate around the pivot pin 93 against the urging force of the spring 95 as best seen in FIG. 15 or 21.

The second pawl driving member 92 also extends generally in a radial direction from the outer end of the pawl driving support portion 84*f*. The second pawl driving member 92 is positioned radially outwardly of the position maintaining pawl 76. More specifically, the second pawl driving member 82 is positioned such that movement of the release member 84 in the wire releasing direction causes the second pawl driving member 92 to contact the operating flange 76*b* of the position maintaining pawl 76 to rotate the position maintaining pawl 76 against the urging force of the positioning pawl biasing member 80. Thus, the second pawl driving member 92 is configured and arranged to movement the position maintaining pawl 76 out of engagement with the shift positioning teeth 60*b* when the release member 84 is fully rotated as best seen in FIGS. 15 and 17 or FIGS. 21 and 22.

Figure 42:
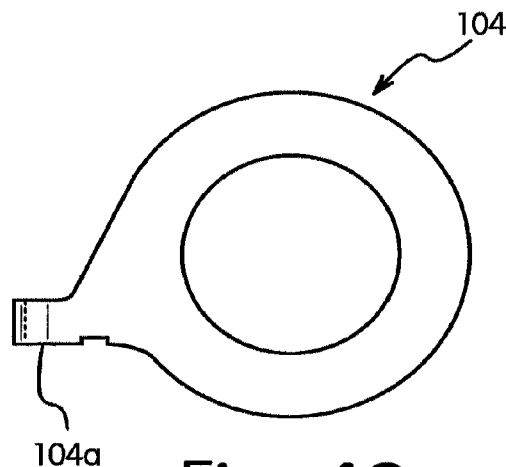
FIG. 42 is an enlarged axial elevational view of the spring support washer for the shift position releasing mechanism of the bicycle control device.
Figure 44:
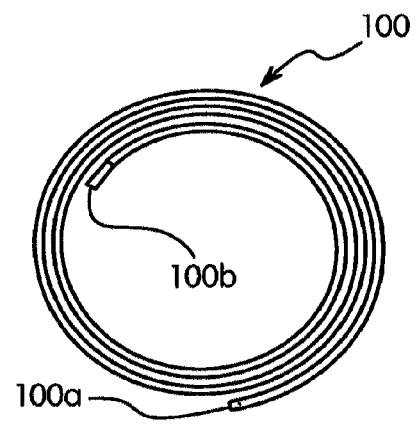
FIG. 44 is an enlarged side elevational view of the shift position releasing spring for apply an urging force to the release member and the main operating member.
Figure 43:
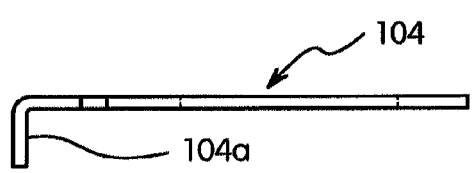
FIG. 43 is an enlarged side elevational view of the spring support washer illustrated in FIG. 42.
Figure 45:
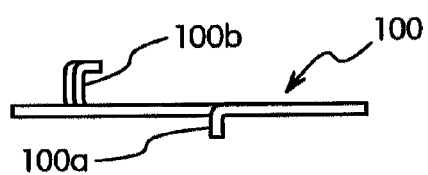
FIG. 45 is an enlarged axial end elevational view of the shift position releasing spring illustrated in FIG. 44.
Figure 46:
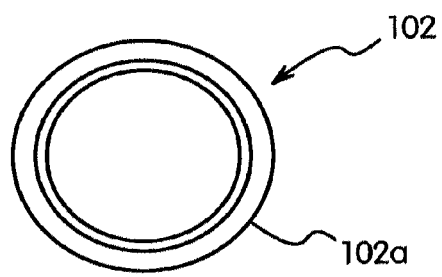
FIG. 46 is an enlarged axial elevational view of the spacer bushing for the shift position releasing mechanism of the bicycle control device.
Figure 47:
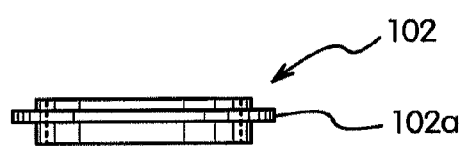
FIG. 47 is an enlarged side elevational view of the spacer bushing illustrated in FIG. 46.

The biasing arrangement 88 is configured and arranged to apply a rotational urging force to both the attachment member 42 of the main operating member 44 and the release member 84 of the shift positioned releasing mechanism 64. Preferably, as seen in FIG. 7, the biasing arrangement 88 includes a biasing member 100 (FIGS. 7, 44 and 45), a spacer bushing 102 (FIGS. 7, 46 and 47) and a washer 104 (FIGS. 7, 42 and 43). The biasing member 100 is preferably a torsion spring that has a first end 100*a* that is secured to the ring mounting portion 84*a* of the release member 84 and a second end 100*b* that engages in the washer 104. Accordingly, the release member 84 and the washer 104 are biased and opposite rotational directions around the main rotational axis of the shifting unit 33. The spacer bushing 102 is received in the center opening of the ring mounting portion 84*a* of the release member 84. The spacer bushing 102 is configured with an annular flange 102*a* that maintains a proper spacing between the ring mounting portion 84*a* of the release member 84 and the washer 104 so that proper clearance is maintained for the biasing member 100. Accordingly, the washer 104 sits on the annular flange 102*a*.

The washer 104 has an L-shaped flange 104*a* extending radially outwardly from its peripheral edge. The L-shaped flange 104*a* is configured and arranged to act as a stop that engages the mounting bracket 72 as well as acts as an urging portion that contacts the attachment member 42 of the main operating member 37. More specifically, the second end 100*b* of the biasing member 100 engages the flange 104a to apply an urging force on the washer 104 such that the attachment member 42 of the main operating member 37 is retained between the stop flange 84*e* of the release member 84 and the flange 104*a* of the washer 104.

Figure 40:
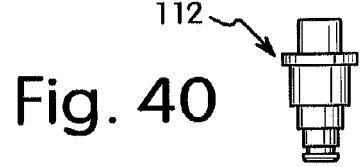
FIG. 40 is an enlarged side elevational view of the winding pawl pivot pin for pivotally supporting the winding pawl on the attachment member of the main operating member.
Figure 41:
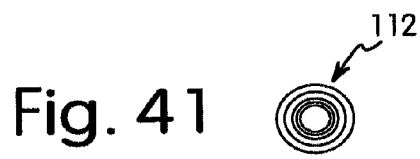
FIG. 41 is an enlarged axial end elevational view of the winding pawl pivot pin illustrated in FIG. 40.

As seen in FIG. 7, preferably, the shift position winding mechanism 66 includes a winding pawl 110 that is mounted to the attachment member 42 of the main operating member 44 by a mounting pin 112 (FIGS. 40 and 41) and a retaining clip 114. Preferably, a torsion spring 116 is mounted on the shaft of the mounting pin 112 to urge the winding pawl 110 in a direction to engage the shift driving teeth 60*c* of the position ratchet 60.

Referring to FIG. 8, a simplified front side elevational view of the bicycle control device 12 is illustrated with the selected parts removed to show the main operating lever 41, the secondary operating (release) lever 58 and the shift position control mechanism 56 in their normal rest positions and with the inner wire 18*a* of the rear shift cable 18 fully withdrawn from the wire takeup member 52. When the shifting unit 33 is in the rest position as seen in FIG. 8, a winding pawl tooth 110*a* of the winding pawl 110 is prevented from engaging the shift driving teeth 60*c* because it contacts the peripheral edge of the mounting bracket 72 adjacent the notch 72*d*.

Figure 9:
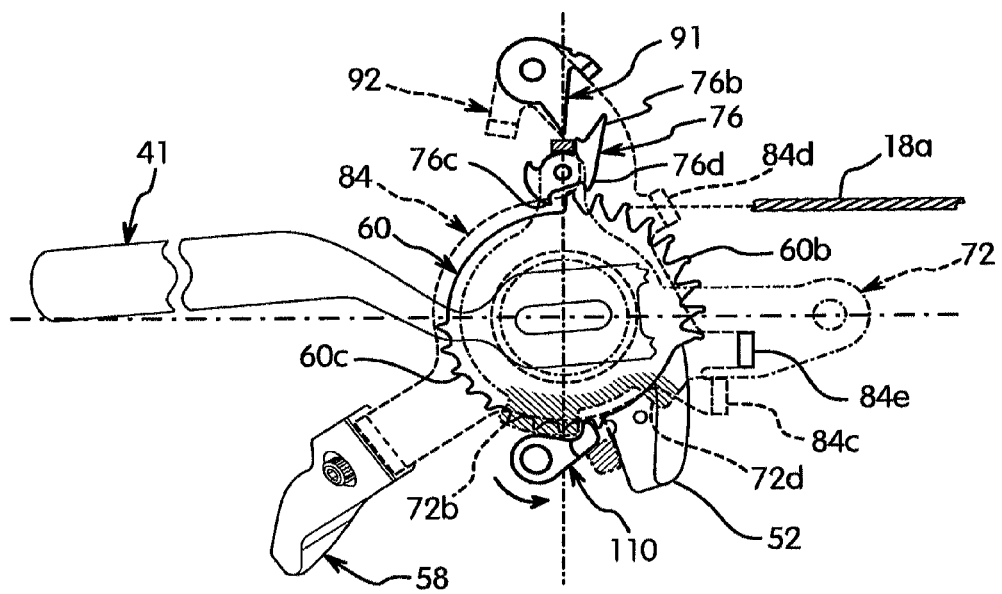
FIG. 9 is a simplified front side elevational view of the bicycle control device, similar to FIG. 8, but with the main operating lever moved in a counterclockwise direction to engage the positioning ratchet which is still in the normal rest position.

Referring to FIG. 9, a simplified front side elevational view of the bicycle control device 12 is illustrated, similar to FIG. 8, but with the main operating lever 41 moved in a counter-clockwise (generally downward) direction such that the shift position winding mechanism 66 engages the positioning ratchet 60 of the shift position control mechanism 56 which is still in the normal rest position. In other words, when the main operating lever 41 is moved in a downward direction, this causes the attachment member 42 to rotate about the main shifting axis such that the winding pawl 110 moves therewith. This movement of the attachment member 42 causes the winding pawl tooth 110*a* of the winding pawl 110 to slide along the peripheral edge of the ring portion 72*b* of the mounting bracket 72 so as to come into alignment with the notch 72*d*. Once the winding pawl 110 has moved into alignment with the notch 72*d*, the spring 116 biases the winding pawl 110 inwardly such that the winding pawl tooth 110*a* contacts one of the shift driving teeth 60*c* as seen in FIG. 9. Then further movement of the main operating lever 41 causes the attachment member 42 and the winding pawl 110 to rotate further about the main shifting axis, which in turn causes the positioning ratchet 60 and the wire takeup member 52 to rotate therewith, since the wing pawl tooth 110*a* is engagement with one of the shift driving teeth 60*c*. While only one shift position is illustrated as occurring in FIGS. 8-12, it will be apparent that the configuration illustrated herein allows for two shifts with a single progressive movement of the main operating lever 41. Moreover, it will be apparent to those skilled in the art that multiple shifts can occur in a single progressive movement of the main operating lever 41 by lengthening the circumferential length of the notch 72*d* to allow for more counterclockwise movement of the positioning ratchet 60 in FIGS. 8-12.

Figure 10:
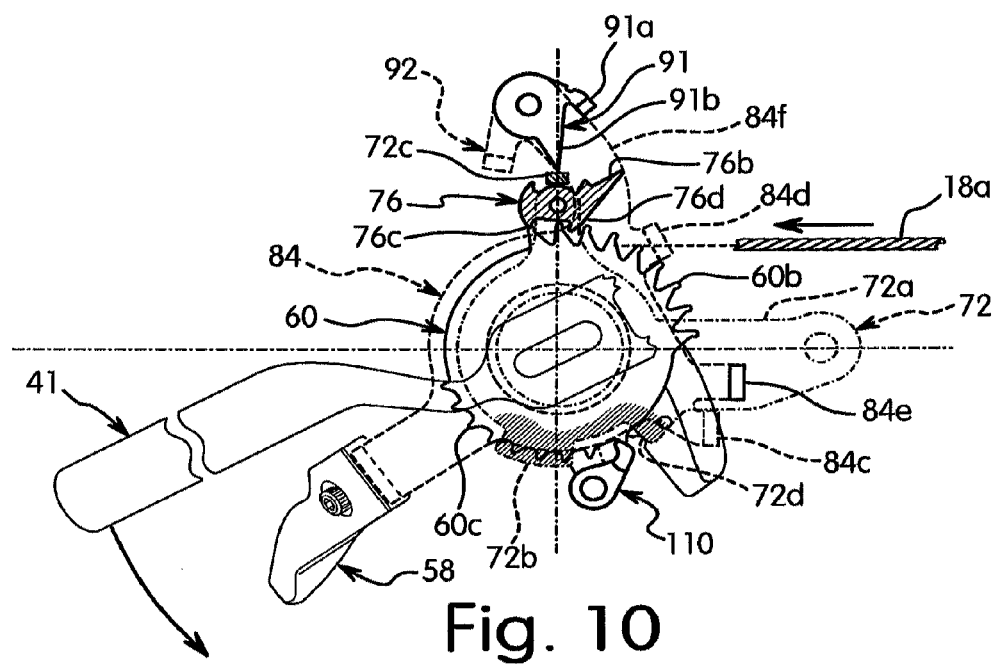
FIG. 10 is a simplified front side elevational view of the bicycle control device in which the main operating lever has been moved to rotate the positioning ratchet in a counterclockwise direction from the normal rest position of FIG. 9.
Figure 11:
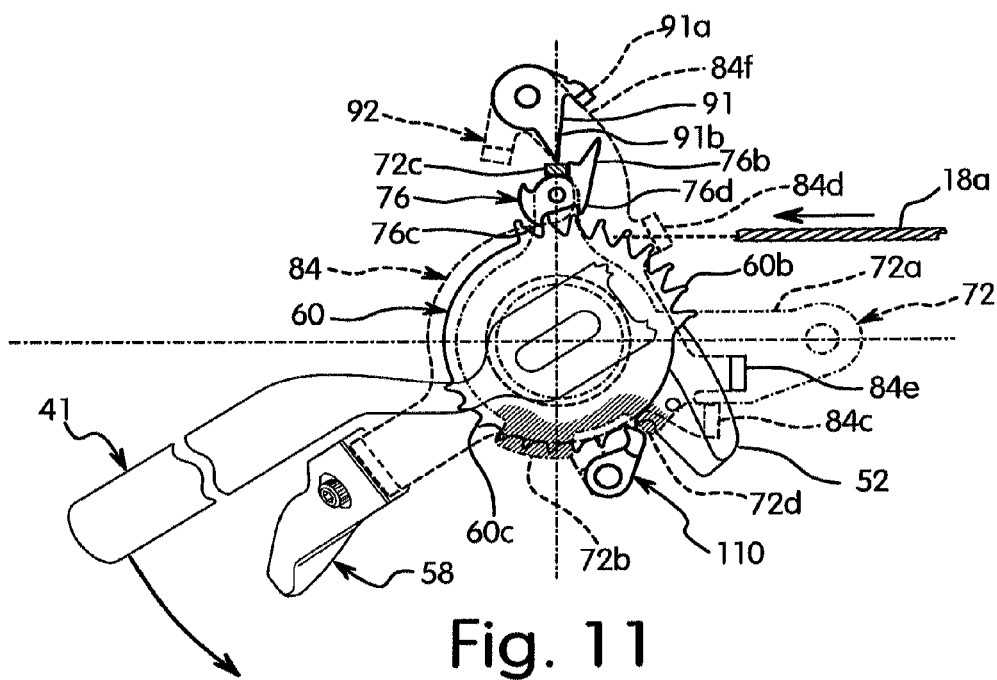
FIG. 11 is a simplified front side elevational view of the bicycle control device in which the main operating lever has been moved further from the position shown in FIG. 10 to rotate the positioning ratchet one shift position from the normal rest position of FIG. 9.
Figure 12:
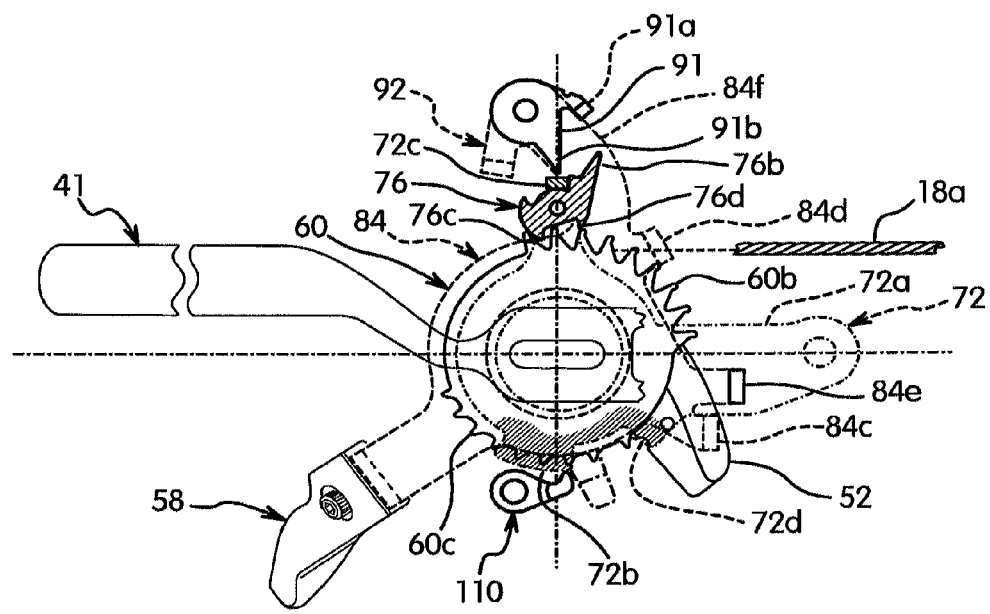
FIG. 12 is a simplified front side elevational view of the bicycle control device in which the main operating lever has been released from the position shown in FIG. 11 to rotate in a clockwise back to its normal rest position.

In particular, referring to FIG. 10, a simplified front side elevational view of the bicycle control device 12 is illustrated, similar to FIGS. 8 and 9, in which the main operating lever 41 has been moved to rotate the positioning ratchet 60 in a counterclockwise direction such that the position maintaining pawl 76 is rotated to allow the positioning ratchet 60 to rotate. As seen in FIG. 11, when the main operating lever 41 has been moved further from the position shown in FIG. 10, the positioning ratchet 60 is rotated one shift position from its prior shift position of FIG. 9 such that the first position maintaining tooth 76*c* moves one shift position to engage the adjacent one of the shift positioning teeth 60*c* as seen in FIG. 12. In particular, FIG. 12 is a simplified front side elevational view of the bicycle control device 12, similar to FIGS. 8 and 9, in which the main operating lever 41 has been released from the position shown in FIG. 11 to rotate in a clockwise back to its normal rest position under the urging force of the biasing member 100, which pushes the washer 104 against the attachment member 42 of the main operating member 37.

Now, referring back to FIGS. 13-16, the releasing operation performed by moving the main operating lever 41 in a clockwise (generally upward) direction will now be briefly discussed. This clockwise (generally upward) movement of the main operating lever 41 causes the release plate or member 84 to be rotated. In particular, the lever mounting section 42*b* of the attachment member 42 contacts the third stop flange 84*e* such that clockwise (generally upward) movement of the main operating lever 41 causes the release plate or member 84 to be rotated against the urging force of the biasing member 100.

Referring first to FIG. 13, a simplified front side elevational view of the bicycle control device 12 is illustrated in which the main operating lever 41, the secondary operating (release) lever 58 and the shift position control mechanism 56 are in their normal rest positions with the inner wire 18*a* of the rear shift cable 18 and the wire takeup member 52 being in their fully retracted positions. Here, the first position maintaining tooth 76c of the position maintaining pawl 76 is engaged with one of the shift positioning teeth 60c of the positioning ratchet 60.

Then referring to FIG. 14, the main operating lever 41 has been moved in a clockwise direction to move the release member 84 such that the position maintaining pawl 76 is moved by the first pawl driving member 91 to allow the positioning ratchet 60 to move slightly in a clockwise direction from the position of FIG. 13. Movement of the positioning ratchet 60 is restricted because the first pawl driving member 91 has rotated the position maintaining pawl 76 such that the second position maintaining tooth 76d catches one of the shift positioning teeth 60c of the positioning ratchet 60.

Next, as seen in FIG. 15, when the main operating lever 41 has been moved further from the position shown in FIG. 14, the first pawl driving member 91 releases the position maintaining pawl 76 such that the first position maintaining tooth 76c catches one of the shift positioning teeth 60c of the positioning ratchet 60 due to the urging force of the positioning pawl biasing member 80 (shown in FIG. 7). In other words, when the first pawl driving member 91 releases the position maintaining pawl 76 and the positioning ratchet 60 moves further in a clockwise direction from the position of FIG. 14 until the first position maintaining tooth 76c catches one of the shift positioning teeth 60c of the positioning ratchet 60. The positioning ratchet 60 is biased in a clockwise direction due to the urging force of the wire takeup biasing member 54 (shown in FIG. 7).

FIG. 16 is a simplified front side elevational view of the bicycle control device 12 in which the main operating lever 41 has been released from the position shown in FIG. 15 to rotate in a counterclockwise direction back to its normal rest position such that the positioning ratchet 60 has only moved one shift position. However, if the main operating lever 41 is not released from the position shown in FIG. 15 and is pushed further in a clockwise (generally upward) direction, then the bicycle control device 12 will perform two shifts in a single progressive movement of the release member 84 as seen by the movements shown in FIGS. 17 and 18.

Figure 17:
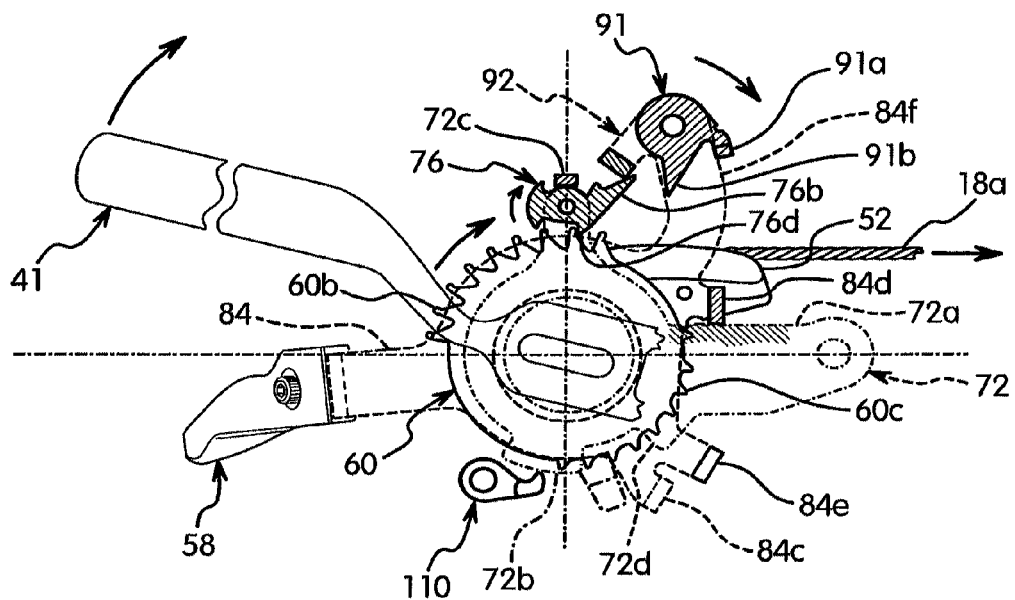
FIG. 17 is a simplified front side elevational view of the bicycle control device, in which the main operating lever has still been moved further from the position shown in FIG. 15 such that such that the second pawl driving member rotates the position maintaining pawl in a clockwise direction to allow the positioning ratchet to move further in a clockwise direction from the position of FIG. 15.

In particular, referring to FIG. 17, a simplified front side elevational view of the bicycle control device 12 is illustrated in which the main operating lever 41 has been moved further from the position shown in FIG. 15 such that the second pawl driving member 92 rotates the position maintaining pawl 76 in a clockwise direction to allow the positioning ratchet 60 to move further in the clockwise direction from the position of FIG. 15 due to the urging force of the wire takeup biasing member 54 (shown in FIG. 7). Movement of the positioning ratchet 60 in the clockwise direction is restricted because the second pawl driving member 92 has rotated the position maintaining pawl 76 such that the second position maintaining tooth 76d catches one of the shift positioning teeth 60c of the positioning ratchet 60.

Figure 18:
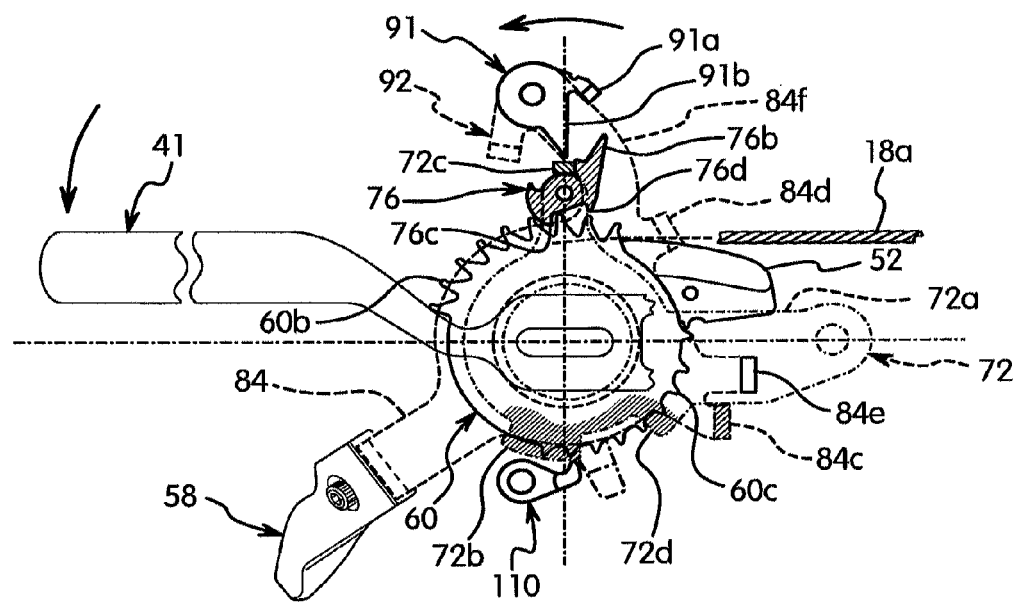
FIG. 18 is a simplified front side elevational view of the bicycle control device in which the main operating lever has been released from the position shown in FIG. 17 to rotate in a counterclockwise direction back to its normal rest position such that the positioning ratchet has moved two shift positions in a single progressive movement of the main operating lever.

When the main operating lever 41 is released from the position shown in FIG. 17, the main operating lever 41 and the release plate or member 84 rotate together in the counterclockwise direction due to the urging force of the biasing member 100 (shown in FIG. 7). Thus, as seen in FIG. 18, the second pawl driving member 92 releases the position maintaining pawl 76 and the positioning ratchet 60 moves further in a clockwise direction from the position of FIG. 17 until the first position maintaining tooth 76c catches one of the shift positioning teeth 60c of the positioning ratchet 60. The positioning ratchet 60 is biased in a clockwise direction due to the urging force of the wire takeup biasing member 54 (shown in FIG. 7).

Now, referring to FIGS. 19-23, the releasing operation performed by moving the secondary operating lever 58 in a clockwise (generally upward) direction will now be briefly discussed. This clockwise (generally upward) movement of the secondary operating lever 58 causes the release plate or member 84 to be rotated. In particular, since the secondary operating lever 58 is mounted to the secondary release lever attachment flange 84b of the release member 84, the generally upward movement of the secondary operating lever 58 causes the release member 84 to be rotated against the urging force of the biasing member 100.

Figure 19:
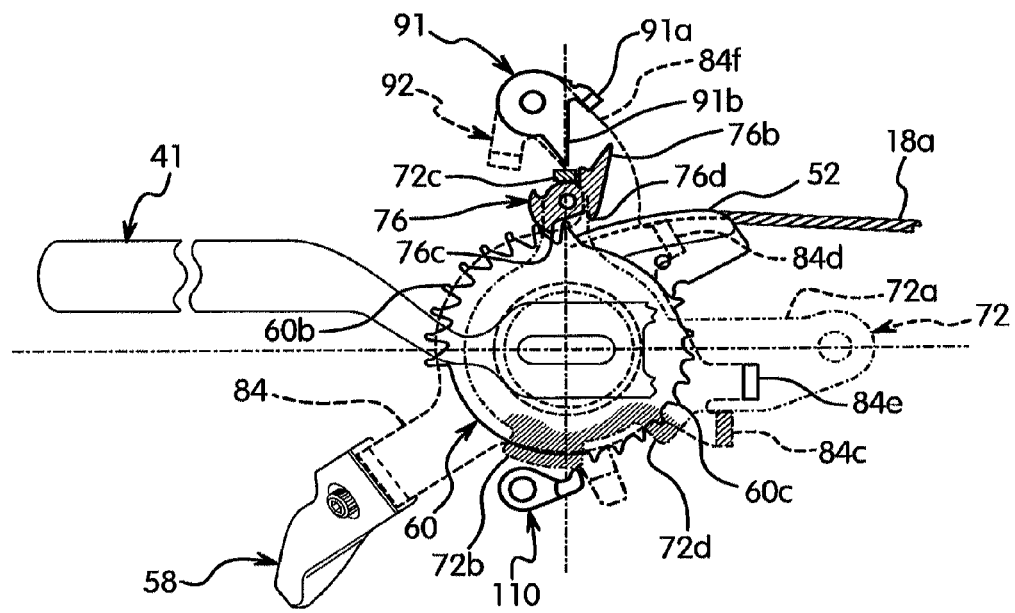
FIG. 19 is a simplified front side elevational view of the bicycle control device in which the main operating lever, the secondary operating (release) lever and the shift position control mechanism are in their normal rest positions when the inner wire of the rear shift cable is fully retracted by the wire takeup member.

Referring first to FIG. 19, a simplified front side elevational view of the bicycle control device 12 is illustrated in which the main operating lever 41, the secondary operating (release) lever 58 and the shift position control mechanism 56 are in their normal rest positions with the inner wire 18a of the rear shift cable 18 and the wire takeup member 52 being in their fully retracted positions. Here, the first position maintaining tooth 76c of the position maintaining pawl 76 is engaged with one of the shift positioning teeth 60c of the positioning ratchet 60.

Figure 20:
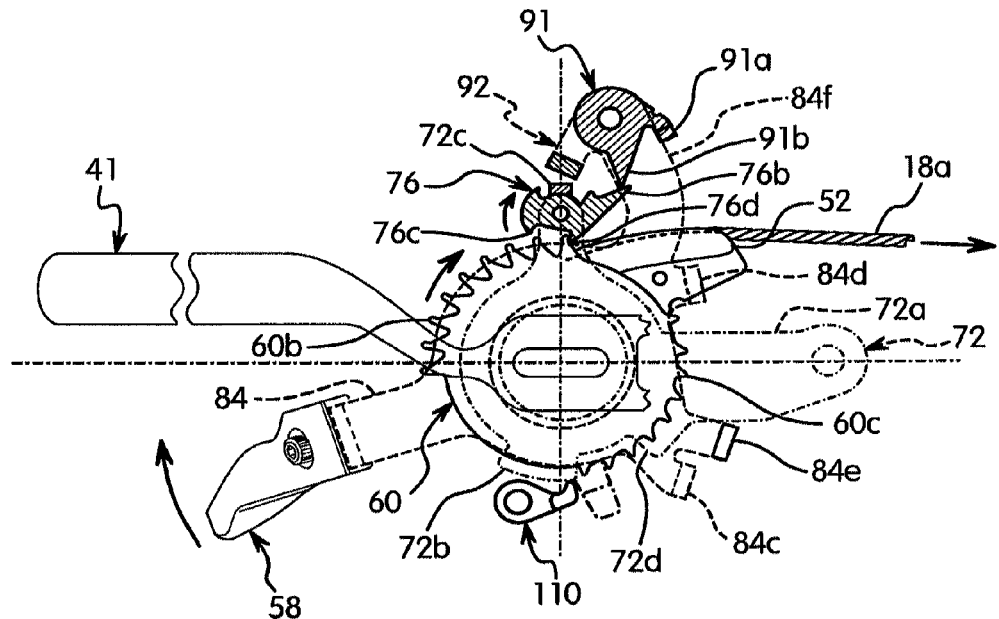
FIG. 20 is a simplified front side elevational view of the bicycle control device, similar to FIG. 19, but with the secondary operating (release) lever moved in a clockwise direction to move the release member such that the position maintaining pawl is moved by the first pawl driving member to allow the positioning ratchet to move slightly in a clockwise direction from the position of FIG. 19.

Then referring to FIG. 20, the secondary operating lever 58 has been moved in a clockwise direction to move the release member 84 such that the position maintaining pawl 76 is moved by the first pawl driving member 91 to allow the positioning ratchet 60 to move slightly in a clockwise direction from the position of FIG. 19. Movement of the positioning ratchet 60 is restricted because the first pawl driving member 91 has rotated the position maintaining pawl 76 such that the second position maintaining tooth 76d catches one of the shift positioning teeth 60c of the positioning ratchet 60.

Next, as seen in FIG. 21, when the secondary operating lever 58 has been moved further from the position shown in FIG. 20, the first pawl driving member 91 releases the position maintaining pawl 76 such that the first position maintaining tooth 76c catches one of the shift positioning teeth 60c of the positioning ratchet 60 due to the urging force of the positioning pawl biasing member 80 (shown in FIG. 7). In other words, when the first pawl driving member 91 releases the position maintaining pawl 76 and the positioning ratchet 60 moves further in a clockwise direction from the position of FIG. 20 until the first position maintaining tooth 76c catches one of the shift positioning teeth 60c of the positioning ratchet 60.

If the secondary operating lever 58 is released at this point, the secondary operating lever 58 will rotate in a counterclockwise direction back to its normal rest position such that the positioning ratchet 60 has only moved one shift position, i.e., see FIG. 16. However, if the secondary operating lever 58 is not released from the position and is pushed further in a clockwise (generally upward) direction, then the bicycle control device 12 will perform two shifts in a single progressive movement of the release member 84 as seen by the movements shown in FIGS. 22 and 23.

Figure 22:
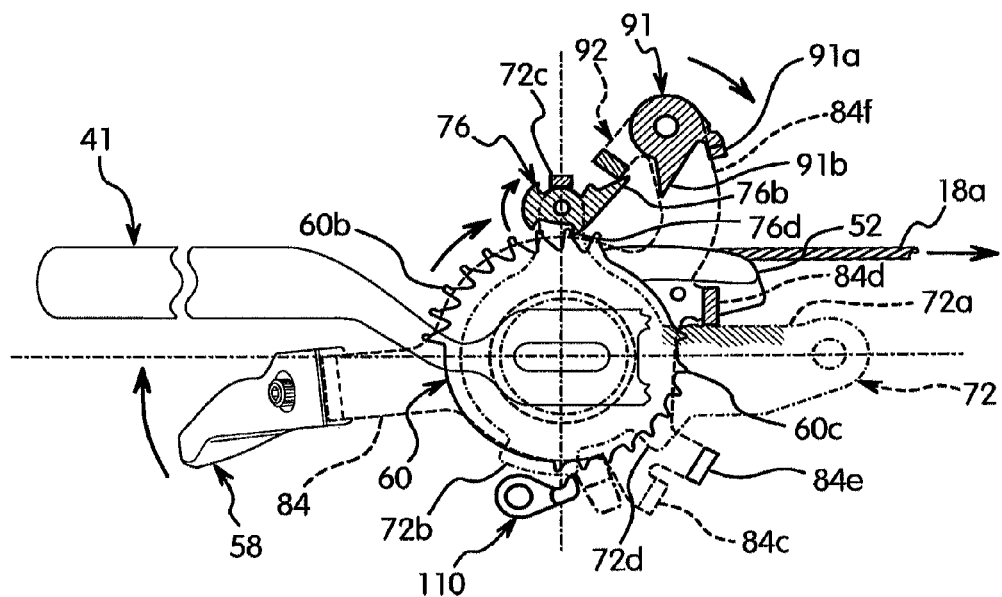
FIG. 22 is a simplified front side elevational view of the bicycle control device, in which the secondary operating (release) lever has still been moved further from the position shown in FIG. 21 such that such that the second pawl driving member rotates the position maintaining pawl in a clockwise direction to allow the positioning ratchet to move further in a clockwise direction from the position of FIG. 21.

In particular, referring to FIG. 22, a simplified front side elevational view of the bicycle control device 12 is illustrated in which the secondary operating lever 58 has been moved further from the position shown in FIG. 21 such that the second pawl driving member 92 rotates the position maintaining pawl 76 in a clockwise direction to allow the positioning ratchet 60 to move further in the clockwise direction from the position of FIG. 20 due to the urging force of the wire takeup biasing member 54 (shown in FIG. 7). Movement of the positioning ratchet 60 in the clockwise direction is restricted because the second pawl driving member 92 has rotated the position maintaining pawl 76 such that the second position maintaining tooth 76d catches one of the shift positioning teeth 60c of the positioning ratchet 60.

Figure 23:
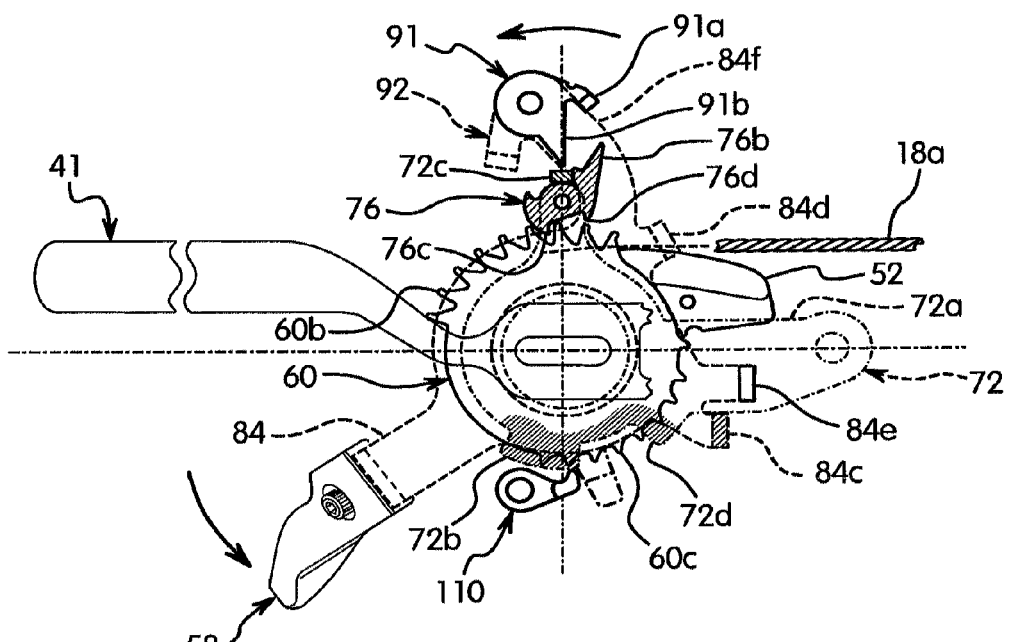
FIG. 23 is a simplified front side elevational view of the bicycle control device in which the secondary operating (release) lever has been released from the position shown in FIG. 22 to rotate in a counterclockwise direction back to its normal rest position such that the positioning ratchet has moved two shift positions in a single progressive movement of the main operating lever.

When the secondary operating lever 58 is released from the position shown in FIG. 22, the secondary operating lever 58 and the release member 84 rotate together in the counter-clockwise direction back to the position shown in FIG. 23 due to the urging force of the biasing member 100 (shown in FIG. 7). Thus, as seen in FIG. 23, the second pawl driving member 92 releases the position maintaining pawl 76 and the positioning ratchet 60 moves further in a clockwise direction from the position of FIG. 22 until the first position maintaining tooth 76c catches one of the shift positioning teeth 60c of the positioning ratchet 60. The positioning ratchet 60 is biased in a clockwise direction due to the urging force of the wire takeup biasing member 54 (shown in FIG. 7).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A position control mechanism for a bicycle control device comprising:
   a positioning member being biased in a first rotational direction about a rotational axis;
   a position maintaining member movably mounted with respect to the positioning member to selectively engage the positioning member for maintaining the positioning member in one of a plurality of predetermined shift positions when the position maintaining member is engaged with the positioning member; and
   a position releasing mechanism including first and second driving members that are movably arranged with respect to the positioning maintaining member to selectively engage the position maintaining member such that the first and second driving members move the position maintaining member from engagement with the positioning member to rotate in the first rotational direction in response to operation of the first and second driving members, the positioning member moving through at least two of the plurality of predetermined shift positions in the first rotational direction in response to a single progressive movement of the position releasing mechanism, the first driving member being located radially outward of the position maintaining member relative to the rotational axis of the positioning member.

2. The position control mechanism according to claim 1, wherein
   the positioning member includes a plurality of ratchet teeth, and the position maintaining member includes a movable positioning pawl that engages the ratchet teeth of the positioning member.

3. The position control mechanism according to claim 1, further comprising
   a wire take up member coupled to the positioning member, and arranged to pull and release a cable wire.

4. The position control mechanism according to claim 1, wherein
   the position releasing mechanism further includes a release member mounted to rotate about the rotational axis of the positioning member and the first and second driving members are mounted on the release member to rotate with the release member about the rotational axis of the positioning member.

5. The position control mechanism according to claim 4, wherein the first driving member is movably fixed to the release member and the second driving member is non-movably fixed to the release member.

6. The position control mechanism according to claim 4, wherein
   the first driving member is movably fixed to the release member to selectively release the position maintaining member from engagement with the positioning member in response to movement of the release member, and the second driving member is non-movably fixed to the release member to selectively release the position maintaining member from engagement with the positioning member in response further movement of the release member such that the positioning member moves through two of the plurality of predetermined shift positions during a single progressive movement of the release member.

7. The position control mechanism according to claim 6, wherein the positioning member includes a plurality of ratchet teeth, and the position maintaining member includes a movably positioning pawl that is arranged to engage the ratchet teeth of the positioning member.

8. The position control mechanism according to claim 7, further comprising
   a wire take up member coupled to the positioning member, and arranged to pull and release a cable wire.

9. The position control mechanism according to claim 6, further comprising
   a wire take up member coupled to the positioning member, and arranged to pull and release a cable wire.

10. The position control mechanism according to claim 1, further comprising
    a wire take up member arranged to rotate about the rotational axis to wind a shift cable wire of a shift cable with the positioning member coupled to the wire take up member;
    a position winding mechanism including a winding pawl movably mounted to rotate the position maintaining member between the predetermined shift positions; and
    a user operating mechanism operatively coupled to the position winding mechanism and the position releasing mechanism to perform a shifting operation by pulling and releasing the shift cable wire,
    the position releasing mechanism including a release member rotatably mounted to rotate about the rotational axis of the positioning member with the first and second driving members being mounted on the release member to rotate with the release member about the rotational axis of the positioning member.

11. The position control mechanism according to claim 10, wherein the positioning member includes a plurality of ratchet teeth, and the position maintaining member includes a movable positioning pawl that is arranged to engage the ratchet teeth of the positioning member.

12. The position control mechanism according to claim 10, wherein the release member is mounted to rotate about the rotational axis of the positioning member.

13. The position control mechanism according to claim 10, wherein the user operating mechanism includes an operating member configured and arranged to perform a braking operation when moved along a braking path and a shifting operation when moved along a shifting path.

14. The position control mechanism according to claim 13, wherein the release member and the operating member are mounted to rotate about the rotational axis of the positioning member.

15. The position control mechanism according to claim 14, wherein the operating member is operatively couple to rotate the positioning member.

* * * * *